(12) United States Patent
Theuerkauf

(10) Patent No.: US 7,644,974 B2
(45) Date of Patent: Jan. 12, 2010

(54) HOOD FOR A CONVERTIBLE

(75) Inventor: Jürgen Theuerkauf, Bramsche (DE)

(73) Assignee: Wilhelm Karmann GmbH, Osnabruck (DE)

( * ) Notice: Subject to any disclaimer, the term of this patent is extended or adjusted under 35 U.S.C. 154(b) by 613 days.

(21) Appl. No.: 10/534,286

(22) PCT Filed: Nov. 5, 2003

(86) PCT No.: PCT/DE03/03666

§ 371 (c)(1),
(2), (4) Date: May 22, 2006

(87) PCT Pub. No.: WO2004/041571

PCT Pub. Date: May 21, 2004

(65) Prior Publication Data

US 2006/0232098 A1    Oct. 19, 2006

(30) Foreign Application Priority Data

Nov. 8, 2002    (DE) ............................... 102 51 961

(51) Int. Cl.
*B60J 7/02* (2006.01)

(52) U.S. Cl. ................................. 296/107.16

(58) Field of Classification Search ............ 296/107.16, 296/107.01, 108, 112, 117, 121, 107.7, 107.08, 296/107.09

See application file for complete search history.

(56) References Cited

U.S. PATENT DOCUMENTS 6,561,565 B2 *    5/2003    Langguth et al. ....... 296/107.04

FOREIGN PATENT DOCUMENTS

| DE | 4041176 | | 5/1992 |
|---|---|---|---|
| DE | 4041176 A | * | 6/1992 |
| DE | 198 01 876 A1 | | 7/1999 |
| DE | 199 62 995 A1 | | 7/2001 |
| DE | 10051436 | | 5/2002 |
| DE | 10051436 A1 | * | 5/2002 |
| EP | 1 038 709 A2 | | 9/2000 |

\* cited by examiner

*Primary Examiner*—H Gutman
(74) *Attorney, Agent, or Firm*—Rothwell, Figg, Ernst & Manbeck, P.C.

(57) ABSTRACT

Disclosed is a hood (1) for a convertible (2), comprising a tail end/roof segment (6), a front roof segment (8) and at least one central roof segment (7). The roof segments (6, 7, 8) comprise opposite roof frame profiles (9, 10, 11) which are symmetrical in relation to a longitudinal axis (33) of the vehicle and can be folded together in a Z-shape by means of a folding mechanism. In order to reduce the packing height of the hood (1), the roof segments (9, 10, 11) lie substantially on top of each other in a parallel manner in a folded position when the hood is open (1) and the outer roof frame profiles (10) of the at least one central roof segment (7) are rotated about the axis, which is at least approximately parallel to the longitudinal axis (33) of the motor vehicle, by means of a guide device (21) in relation to a position when the hood is closed and are displaced in the direction of the center of the vehicle.

30 Claims, 20 Drawing Sheets

HOOD FOR A CONVERTIBLE

CROSS REFERENCE TO RELATED APPLICATION

This application is a 35 U.S.C. § 371 National Phase Entry Application from PCT/DE03/03666, filed Nov. 5, 2003, and designating the U.S.

BACKGROUND OF THE INVENTION

1. Field of the Invention

This invention relates to a convertible top for a convertible vehicle of the type defined more specifically in the preamble of Patent Claim 1.

2. Description of Related Art

In convertible vehicles in which the convertible top is folded when the top is down, i.e., open, and in which the convertible top is usually stored in a storage space in the rear-end area of the vehicle, the height of storage, i.e., the packing height, of the folded roof is of great importance because a large packing height limits the design freedom in the rear-end area of the vehicle and also greatly limits the possible dimensions of the luggage area.

DE 100 51 436 A1 discloses a multipart convertible top for a convertible vehicle, where the convertible top has a gasket apparatus with a movably mounted gasket for sealing a movable roof part with respect to an adjacent vehicle part, where the gasket is pivotably mounted with respect to the movable roof part and is pivoted into its sealing position in relation to the roof part when the movable roof part assumes a sealing position, and is pivoted into a storage position when the movable roof part is moved into a position without a sealing function. In particular, the movable roof part is a rear-end roof part which can be stored horizontally in the opposite direction in a storage space in the rear end of the vehicle under a front roof part when the top is down, in which case the gasket arranged on the side of the rear-end roof part for a side window is pivotable inward with respect to the rear-end roof part when the latter is stored. The gasket is pivotable in the direction of the middle of the vehicle such that the rear-end roof part and the front-end roof part can be positioned closely one on top of the other, so the height of the storage space can be reduced by approximately the size of the gasket.

The drive device provided for the pivoting movement of the gasket in DE 100 51 436 A1 is, for example, a coupling rod which couples the movable gasket to the movable roof part or a roof part executing a relative movement with respect to the gasket.

Another possibility for shifting an external roof frame part toward the middle of the vehicle in a top-down movement of a convertible folding top is described in DE 40 41 176 A1, which proposes a sealing element attached to the folding top for a gasket apparatus of the folding top, with the sealing element being in sealing contact with an edge area of a closed side window when the folding convertible top is up. In this case, when the top is put down, an outside area of the sealing element is shifted laterally inward via an adjustment device designed essentially as a rocker arm path.

However, with these known approaches, only a slight reduction in the storage height of the folded roof package can be achieved with a multipart top that folds in accordion fashion due to the fact that the respective roof parts are stored in opposite directions stacked one above the other.

SUMMARY OF THE INVENTION

The object of the present invention was therefore to create a convertible top for a convertible vehicle of the type described in greater detail above, such that its packing height is further reduced when the top is down and folded.

In accordance with the invention, said object is achieved through the features in the characterizing part of Patent Claim 1.

In one embodiment of the inventive top, the roof segments are situated essentially one on top of the other with the curvature in the same direction when the top is down and folded and in which the outer roof frame profiles of at least one central roof segment are rotated about an axis that is at least approximately parallel to the longitudinal axis of the vehicle by means of a guide mechanism in comparison with a position when the top is up and are also shifted in the direction of the middle of the vehicle. This embodiment has the advantage of a particularly low height in the folded state, so that the stored top takes up very little storage space in the respective storage space provided for the convertible top. This results in the possibility of designing the storage space for the top to be smaller, which in turn permits greater design freedom in the rear-end area of the vehicle and creates an enlarged luggage space.

The outer roof frame profiles in the sense of the invention may have any design with regard to their cross section, their structure and their material composition and have sealing elements, e.g., in areas provided for contact with adjacent components such as side windows.

In a particularly preferred and visually attractive embodiment, the roof segments in the folded position lie one above the other in such a way that their respective curvature is facing away from the bottom of the vehicle, i.e., in the folded state their ends at the front and rear are each pointing downward. However, in deviation from this, is it also possible, while achieving a low packing height, for the roof segments to be folded in such a way that the curvature of each is facing the bottom of the vehicle.

A simple design of the rotation and displacement of the outer roof frame profiles of the preferably one central roof section can be achieved if the guide mechanism of the outer roof frame profile has a guide rod connected to the convertible top mechanism, with the outer roof frame profile being axially displaceably guided on the guide rod and being rotated with respect to its longitudinal axis, preferably at least approximately 180° in an axial movement with respect to the guide rod.

The guidance of the outer roof frame profile on the guide rod can be implemented in a simple manner by means of a sliding block which engages in a groove created in the form of a spiral in the guide rod, with the sliding block being connected to the kinematics of the mechanism of the convertible top via a coupling element for the axial displacement.

Alternately to this, it is also possible in accordance with another preferred embodiment for the guide mechanism of the outer roof frame profile of the at least one central roof segment to have a control rod connected to the mechanism of the convertible top, this control rod being pivotable about a pivot axis running parallel to the transverse axis of the vehicle and on which the outer roof frame profile is connected in an articulated manner by a lever arrangement, with the lever arrangement being pivotable via tilted axes which run at an angle to the pivot axis of the control rod in such a way that the outer roof frame profile is displaced in the direction of the center of the vehicle by pivoting of the control rod with respect to its longitudinal axis and/or and axis parallel to the longitudinal axis of the vehicle.

In deviation from this, however, those skilled in the art could also select a different design suitable for the respective application case for rotation of a component relative to a guide element.

In a preferred embodiment, the convertible top in accordance with the invention is a convertible top movable automatically from a top-down position into a top-up position or vice versa, with the movement of the convertible top being usually accomplished through a hydraulic drive which drives a mechanism of a convertible top that is to be understood in the present case as including both a carrying apparatus for a textile roof as well as a so-called collapsible hard top with essentially rigid roof elements and optionally includes a cover for a convertible top receptacle space and all the movable elements in this case.

In particular, the inventive embodiment of the convertible top is suitable for a so-called soft top roof in which the roof segments are designed with a flexible roof membrane.

In the case when at least the rear-end roof segment is designed with a flexible roof membrane which is accommodated between the outer roof frame profiles assigned to the rear-end roof segment and which encompasses a dimensionally stable rear window, a significant reduction in packing height of the convertible top in the stored and folded state can be achieved when the rear window and the outer roof frame profiles of the rear-end roof segment are converted into or out of the folded position in a movement in the same direction.

Due to the movement of the rear window and the outer roof frame profiles, which here represent the so-called main pillars, in the same direction, the convertible top can be implemented with much shorter lengths of cloth for the textile roof membrane, so that the area of the C pillar of the vehicle can also be designed to be very narrow.

A particularly small amount of material is needed in particular for the textile roof membrane when the rear window and the outer roof frame profiles of the rear-end roof segment are arranged essentially parallel to one another during their movement into or out of the folded position.

The movement of the rear window and the outer roof frame profiles of the rear-end roof segment such that the movement is in the same direction and preferably parallel can be implemented in a simple design via a connection of an outer roof frame profile of the rear-end roof segment to a 4-bar linkage mechanism connected in an articulated manner to a vehicle body, with two articulated joints of the 4-bar linkage mechanism being connected fixedly to the vehicle body and two articulated joints being provided on the respective outer roof frame profile.

Other advantages and advantageous embodiments of the object in accordance with this invention can be derived from the description, the drawing and the patent claims.

Two exemplary embodiments of a convertible top in accordance with this invention are depicted in simplified schematic diagrams in the drawing and described in greater detail in the following description.

DETAILED DESCRIPTION OF THE INVENTION

Figure 1:
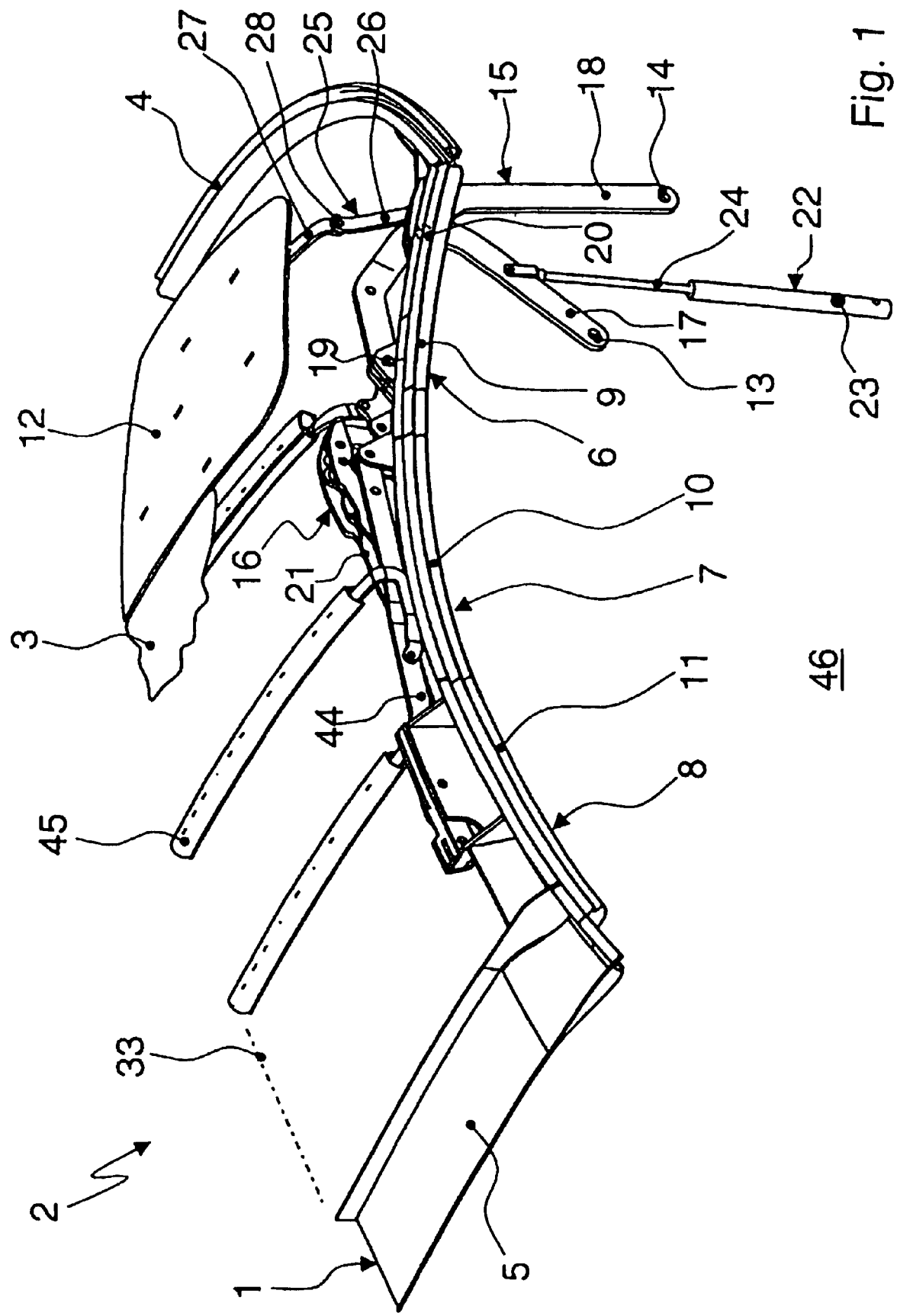
FIG. 1 shows a simplified three-dimensional view of an inventive convertible top for a convertible vehicle, the top being shown alone in the up [i.e., closed] position.

FIG. 1 shows a convertible top 1 for a convertible vehicle labeled as 2 on the whole, having a flexible roof membrane 3 comprised of multilayer textile material, for example, stretched between a rear-end main convertible top tension bar 4 in the up position of the top 1 and a dimensionally stable roof tip 5 provided on a front windshield frame. The flexible roof membrane 3, only a detail of which is shown in FIG. 1, spans a rear-end roof segment 6, a central roof segment 7 and a front roof segment 8 between pairs of symmetrically arranged outer roof frame profiles 9, 10, 11, which are depicted for only one half of the vehicle in the drawing, assigned to these roof segments opposite a longitudinal axis 33 of the vehicle and form the edges of the roof segments.

In the area of the rear-end roof segment 6, the flexible roof membrane 3 encompasses a dimensionally stable rear-end windshield 12, with a frame, if necessary.

The outer roof frame profiles 9, 10, 11 are part of a convertible top mechanism by means of which the top 1 and thus the roof segments 6, 7, 8 can be collapsed and converted from a first end position (illustrated in greater detail in FIG. 1 through FIG. 3, for example), which represents a top-down position, into a second end position (shown in FIG. 9 through FIG. 11 in greater detail, for example) which represents a folded position with the top 1 down.

Because the convertible top mechanism is designed identically on the two sides of the vehicle in the present embodiment, explanations concerning the elements shown here of the convertible top mechanism also apply to the elements arranged on the other side of the vehicle, which are not shown here but area symmetrical with the former.

Figure 2:
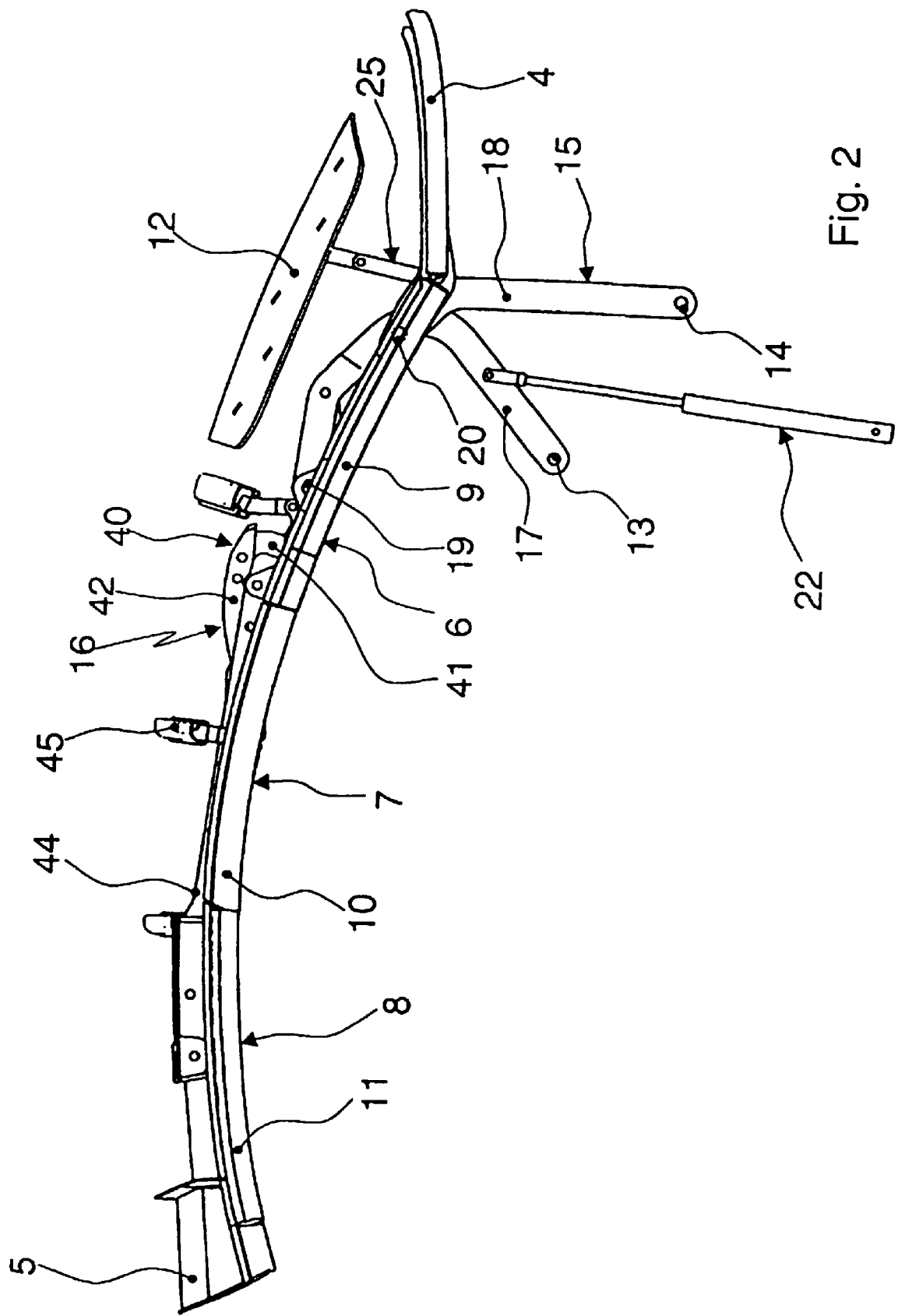
FIG. 2 shows a schematic side view of the convertible top in the up position in accordance with FIG. 1.

As shown in FIG. 1 and FIG. 2, for example, the respective outer roof frame profile 9 of the rear-end roof segment 6 forms a so-called main pillar which in the present case is connected to a 4-bar linkage mechanism 15 which is in turn connected in an articulated manner to two pivot points 13, 14 fixedly provided on the body and connected to an articulated chain 16, which transmits the movement introduced into the main pillar 9 to other elements of the convertible top mechanism.

FIGS. 1, 2, 4, 6, 8 and 9 illustrate the embodiment and functioning of the 4-bar linkage mechanism 15 during various movement phases of the convertible top 1. This 4-bar linkage mechanism is designed with a first angled lever 17 and a second angled lever 18, each of which is rotatably mounted on a pivot point 13 and/or 14, which is fixedly provided on the body, and on the outer roof frame profile 9 of the rear-end roof segment 6.

The first lever 17 in the present embodiment is designed essentially in a U shape and is supported with one end of the leg on a joint 19 in an area of the outer roof frame profile 9 which is at the front in the up position of the top 1, and with its other end of the leg is rotatably connected to the pivot point 13 that is fixedly provided on the body and is assigned to that end, this pivot point being arranged offset to the front and higher than the pivot point 14 of the second lever 18, said pivot point also being fixedly provided on the body.

The second lever 18 is designed essentially in an L shape in the present case and is hinge-connected at its shorter leg to a bearing and/or joint 20 in an area toward the rear end of the outer roof frame profile 9 of the rear-end roof segment 6, and is hinge-connected at the end of its longer leg to the pivot point 14 assigned to it and fixedly provided on the body.

For the movement of the convertible top 1 between its up position and its folded position, in which it is folded together with the elements of its convertible top mechanism and stored in a convertible top box, i.e., a receptacle space (not shown here), a drive 22 which is known per se is provided in the present case; this is an electro-hydraulic drive with a drive cylinder 23 and a drive rod 24 axially displaceable therein. In the embodiment shown here, it is advantageous for the flow of forces if the drive train 24 of the drive 22 is fixedly hinge-connected on the body to the leg of the first lever 17 leading to the pivot point 13. However, the drive of the convertible top 1 may also act on any other spots in the convertible top mechanism that are regarded by those skilled in the art as suitable for the respective application case.

In the embodiment shown here, an articulated strap 25 comprised of two legs 26, 27 connects the rear window 12 to the 4-bar linkage mechanism 15 and is connected to the second lever 18 of the 4-bar linkage mechanism 15. A first leg 26 of the articulated strap 25 is rigidly connected to the second lever 18 of the 4-bar linkage mechanism 15 and is aligned essentially axially to the longer leg thereof and inclined in the direction of the center of the vehicle. A second leg 27 of the articulated strap 25 is arranged essentially perpendicular to the first leg 26, and is connected to the rear window 12 and/or a frame surrounding same and to the first leg 26 by means of a joint 28 so that it is pivotable about an axis of rotation running in the transverse direction of the vehicle.

In the embodiment of the convertible top 1 shown here, the rear-end main convertible top tension rod 4 is likewise mounted in an articulated manner on the second lever 18 of the 4-bar linkage mechanism 15.

With the movement of the top between its end positions, the rear window 12 and the outer roof frame profiles 9 of the rear-end roof segment 6 are guided in a movement in the same direction, with the rear window 12 and the outer roof frame profiles 9 of the rear roof segment 6 being arranged essentially parallel to one another during the movement.

Because of this movement in the same direction, which is implemented advantageously by the 4-bar linkage mechanism 15 described here, but may also be implemented by another corresponding mechanism that executes deflections in other embodiments, a clearly smaller length of cloth is needed than is the case with convertible tops in which the main pillar and the rear window are rotated toward one another during the top-down and/or top-up movements of the convertible top. The packing height when the convertible top 1 is folded and stored is thus also reduced accordingly.

A clear reduction in the packing height of the convertible top in the folded state is also achieved with the convertible top 1 in accordance with the invention in that the roof segments 6, 7 and 8 are arranged essentially one on top of the other with the curvature in the same direction in the folded position when the convertible top 1 is down, and the outer roof frame profiles 10 of the central roof segment 7 are rotated in the direction of the center of the vehicle and are displaced in a manner to be explained in greater detail below with respect to a position in which the convertible top 1 is up.

In the embodiment in accordance with FIG. 1 through FIG. 12, a guide mechanism 21 with a guide rod 29 motion-coupled to the convertible top mechanism for the outer roof frame profile 10 is provided for the outer roof frame profile 10 for rotation of said outer roof frame profile 10 of the central roof segment 7 in the direction of the center of the vehicle in a top-down movement and in the opposite direction in a top-up movement of the convertible top 1, with the guide of the outer roof frame profile 10 on the guide rod 29 in this embodiment illustrated in greater detail in particular in FIG. 3 through 8 being implemented by means of a combined axial and rotational movement in which the axial movement of the outer roof frame profile 10 with respect to the guide rod 29 takes place as a function of the movement of the main pillar transmitted by the articulated chain 16 and/or the outer roof frame profile 9 of the rear-end roof segment 6 and the drive 22.

The axial movement of the outer roof frame profile 10 is converted into a rotational movement of the outer roof frame profile 10 of the central roof segment 7 by a guide, which is designed here as a spiral groove 30 provided in the guide rod 29; this is accomplished by the outer roof frame profile 10 sliding along the groove 30 by means of a sliding block 31 which is coupled via coupling element 32 to the articulated chain 16 and thus the kinematics of the convertible top mechanism.

Figure 3:
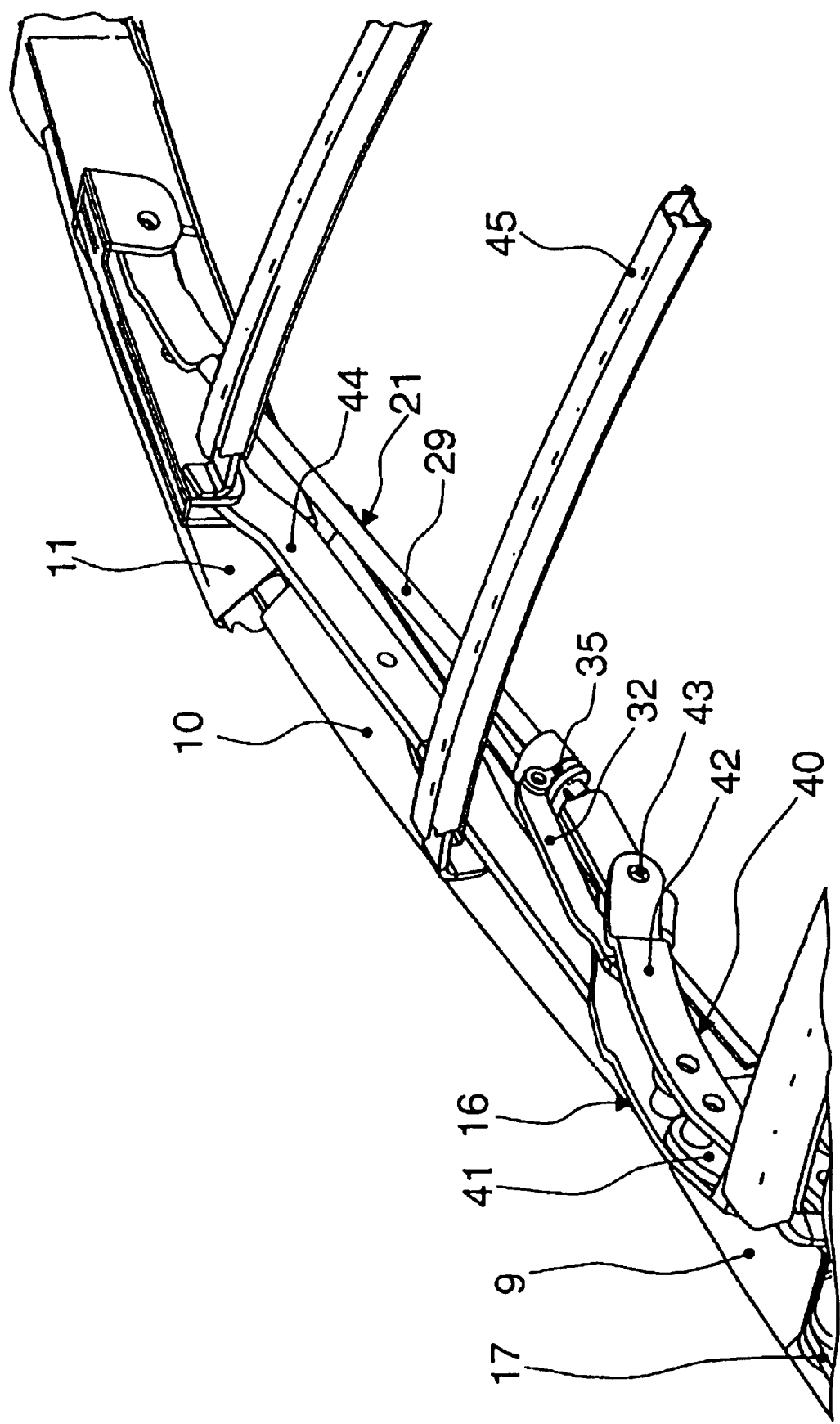
FIG. 3 a sectional view of a first embodiment of a convertible top mechanism from the perspective of the center of the vehicle forward after initiating a top-down movement of the convertible top in accordance with FIG. 1 and FIG. 2.
Figure 4:
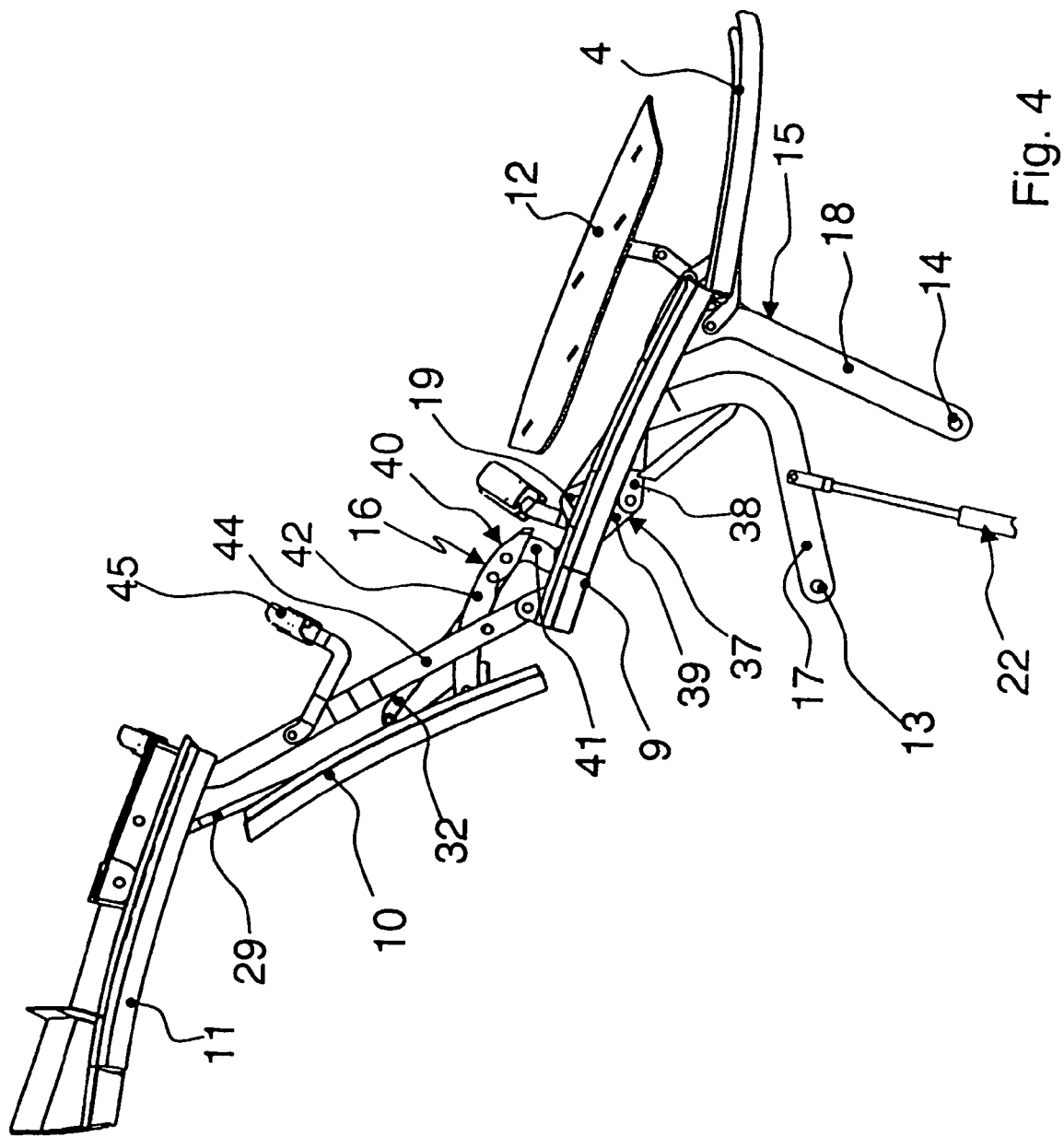
FIG. 4 shows another side view of the convertible top in accordance with FIG. 1 through FIG. 3 during a continued movement phase of the top-down movement of the convertible top.
Figure 5:
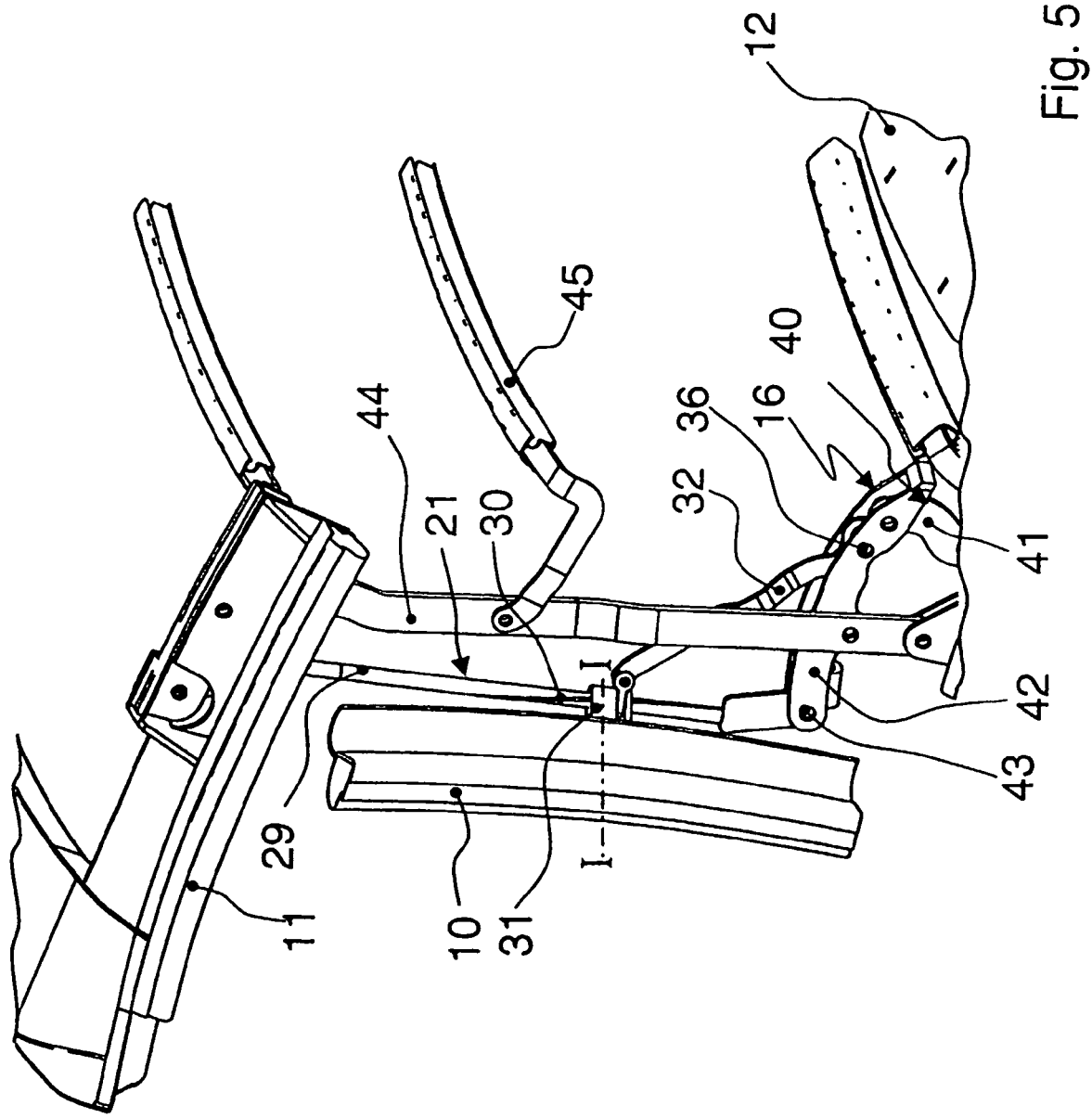
FIG. 5 shows another detailed diagram of the convertible top mechanism from a perspective on the left of the vehicle forward in the top-down movement of the top.
Figure 6:
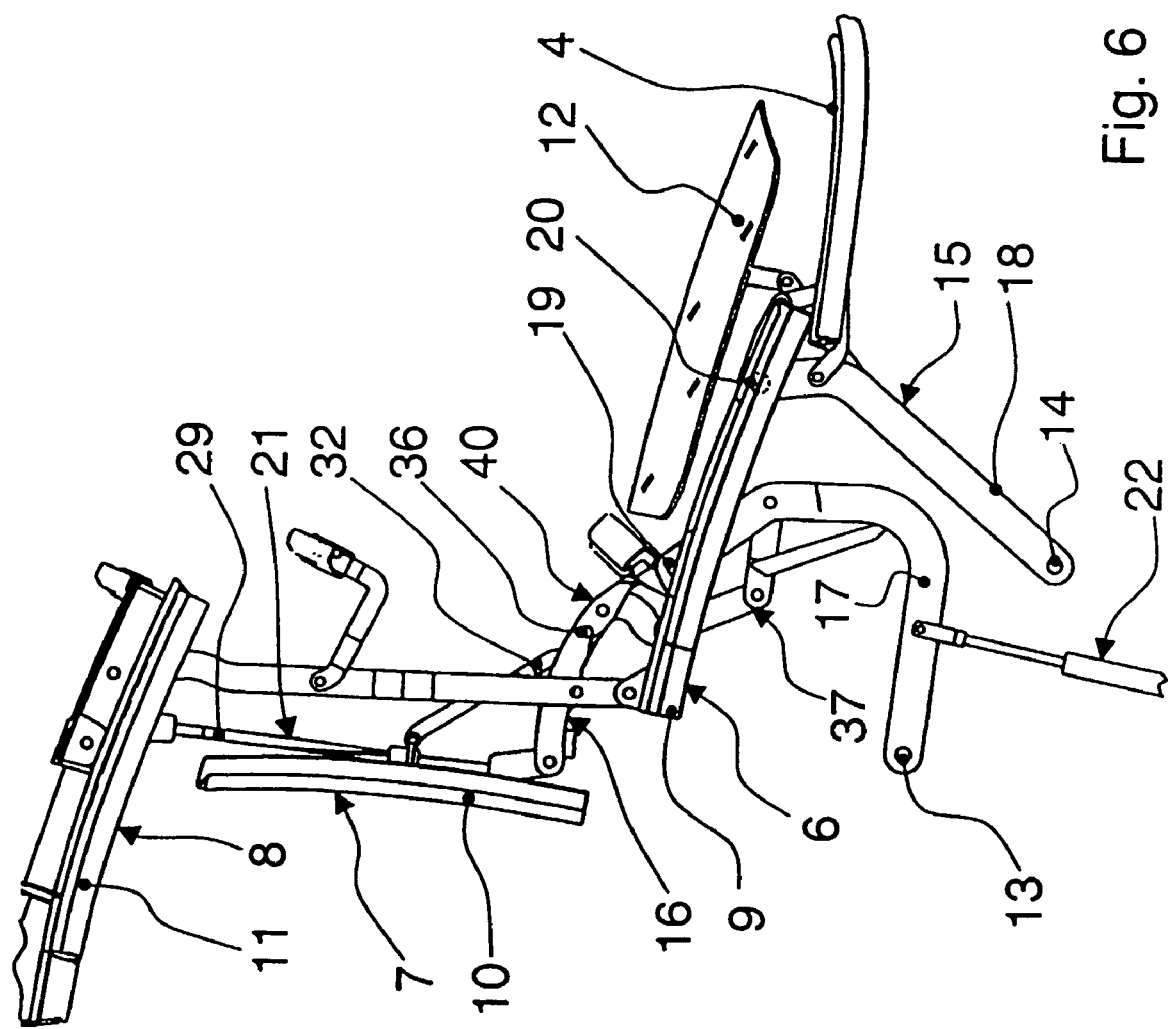
FIG. 6 shows another side view of the convertible top in accordance with FIG. 1 through FIG. 3, with the top moving in the direction of the rear end of the vehicle.
Figure 7:
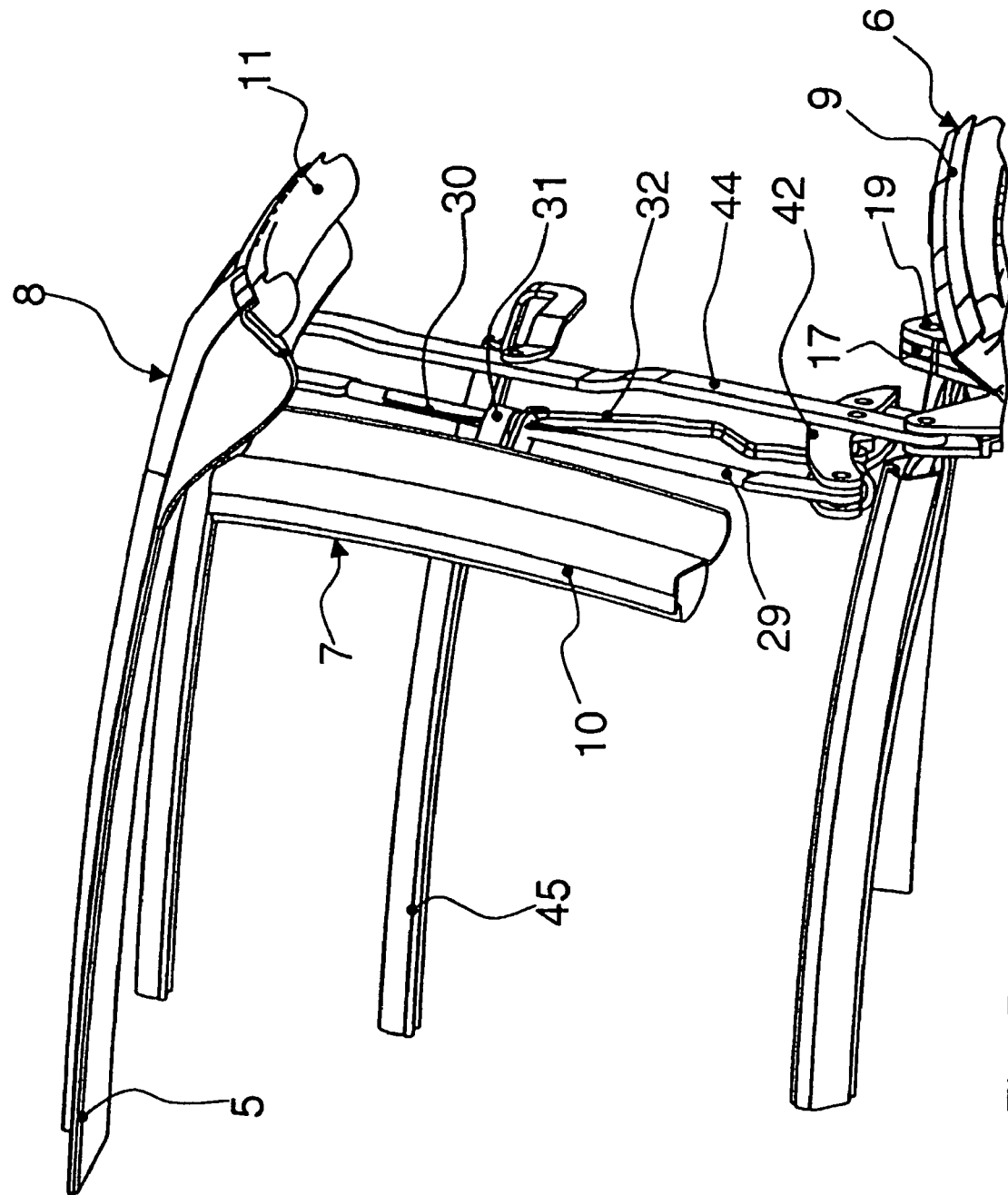
FIG. 7 another sectional view of the convertible top mechanism from a perspective on the right side of the vehicle forward in the top-down movement of the convertible top.
Figure 8:
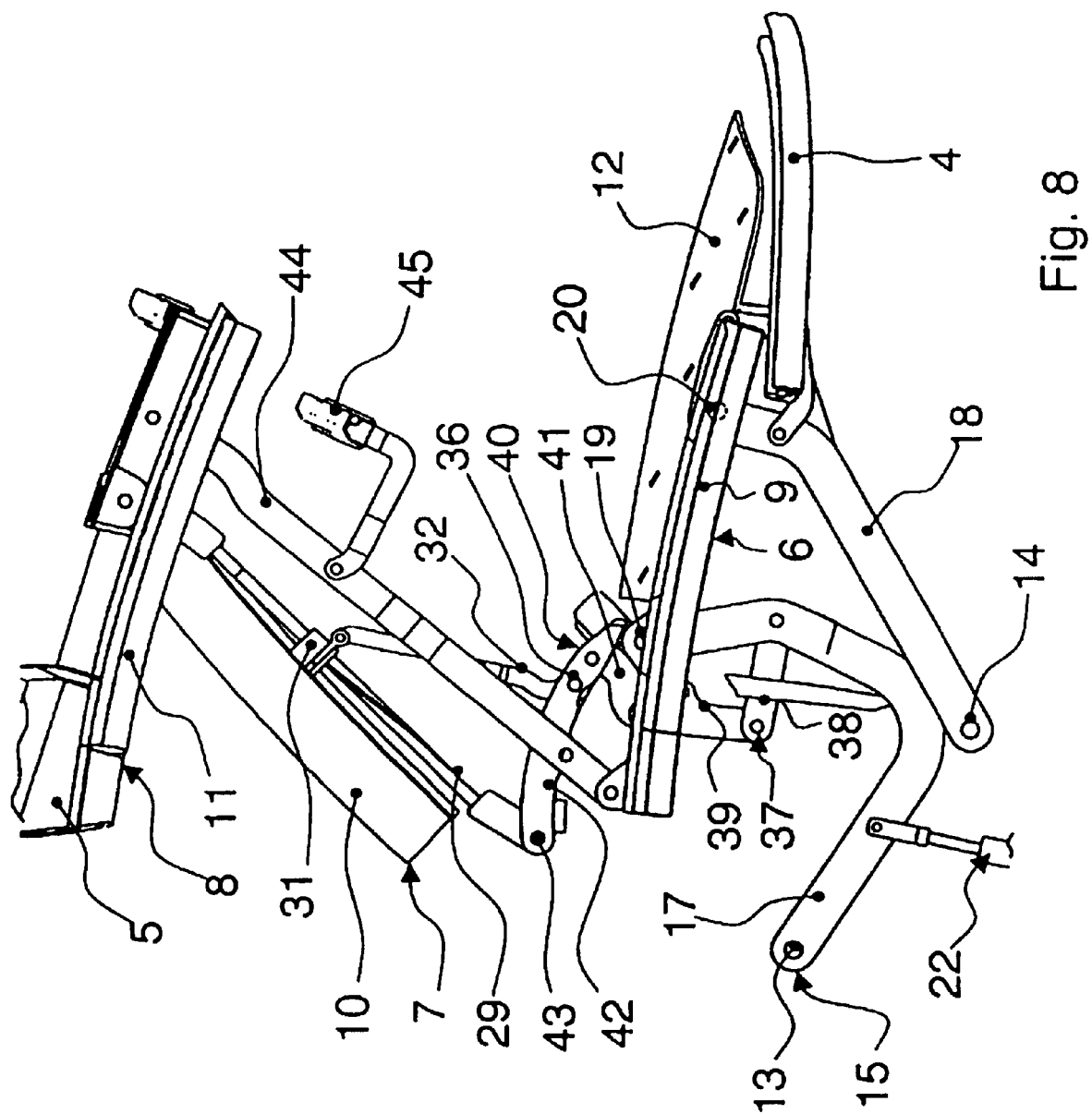
FIG. 8 shows another movement phase of the convertible top in accordance with FIG. 1 through FIG. 7, with the convertible top having moved further in the direction of the rear end of the vehicle in comparison to the diagram in FIG. 6.
Figure 9:
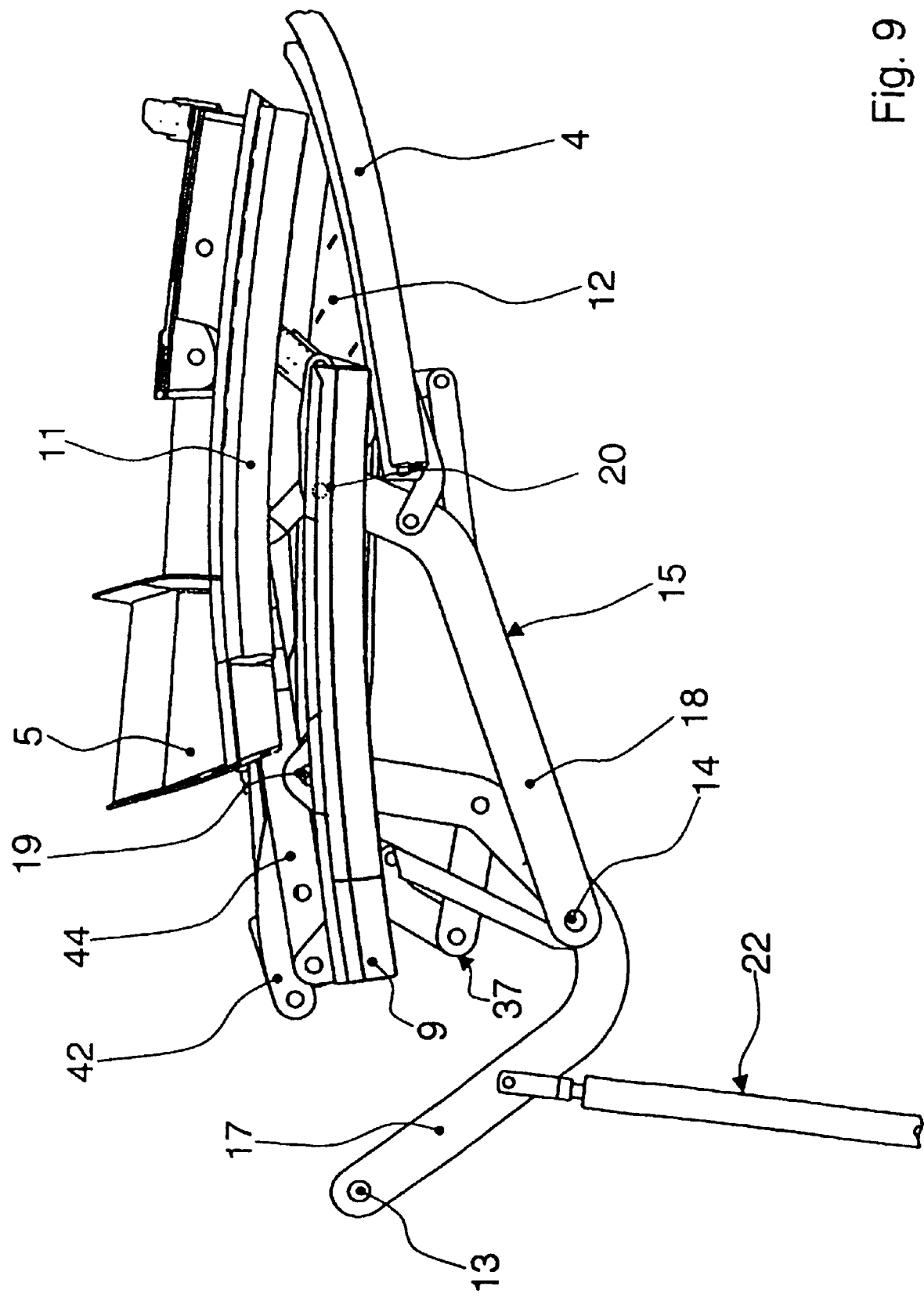
FIG. 9 shows a side view of the convertible top in accordance with FIG. 1 through FIG. 8 in the folded position in the completely down state.
Figure 10:
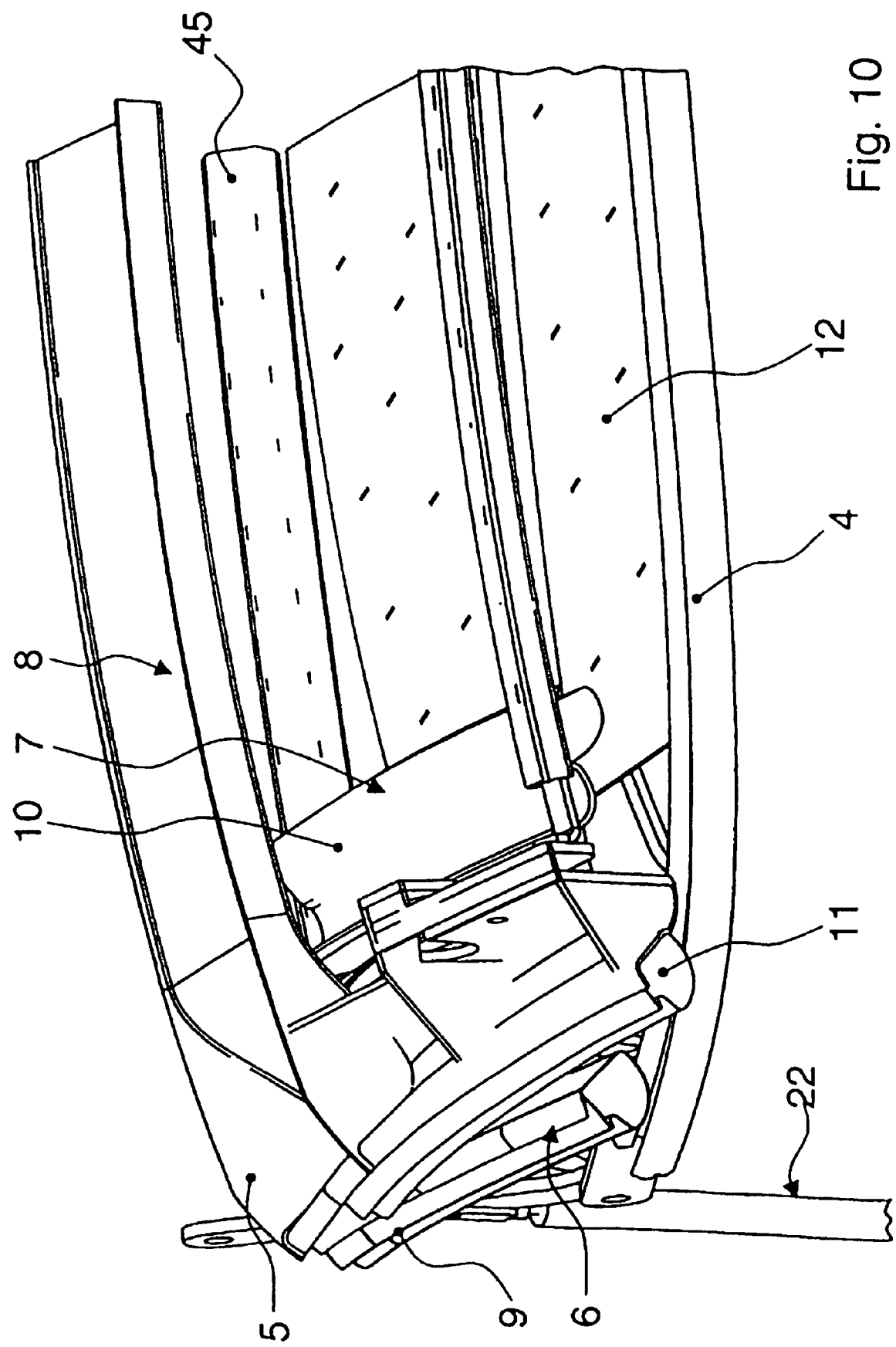
FIG. 10 shows the convertible top which is in the folded position in FIG. 9 in a three-dimensional view from a perspective on the left side of the vehicle forward.
Figure 11:
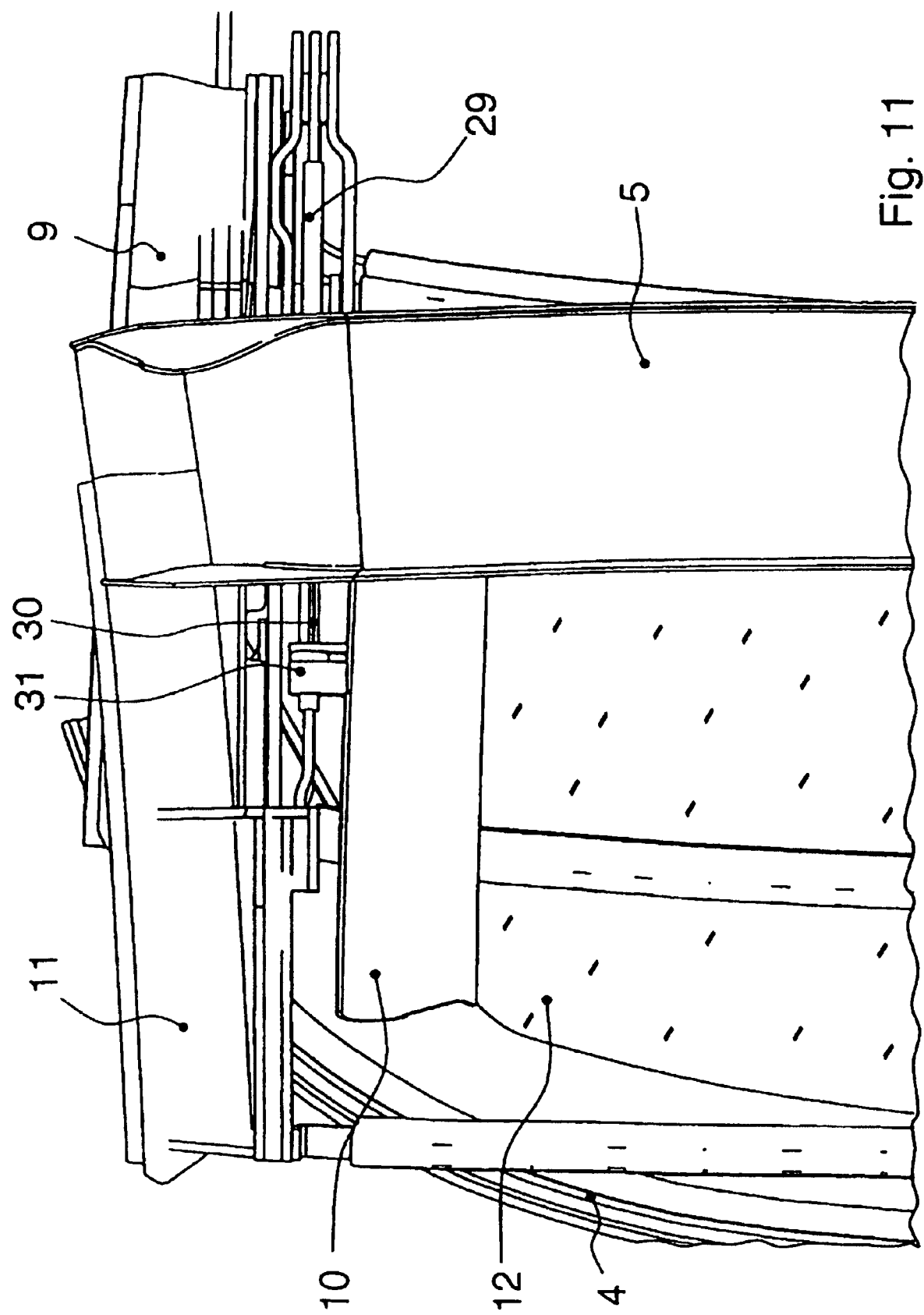
FIG. 11 shows the convertible top in the folded position in accordance with FIGS. 9 and 10 shown here in a top view.

From a comparison of the position of the outer roof frame profile 10 of the central roof segment 7 with respect to the guide rod 29 when the convertible top 1 is slightly down in accordance with FIG. 3, which shows the area of the guide rod 29 as seen from the center of the vehicle, during an additional movement phase for putting down the convertible top 1 which is shown in FIG. 5 in an oblique view from the left rear-end area of the convertible vehicle, and during a continued stage of movement of the top-down movement of the convertible top 1 which is shown in FIG. 7 from the perspective of a left vehicle front area of the convertible vehicle, it can be seen that the outer roof frame profile 10 of the central roof segment 7 is displaced along the guide rod 29 and in doing so is rotated about an axis parallel to the longitudinal axis 33 of the vehicle, ultimately rotating it 180° until reaching the folded position when the convertible top 1 is completely down (FIG. 9 through FIG. 11).

Figure 12:
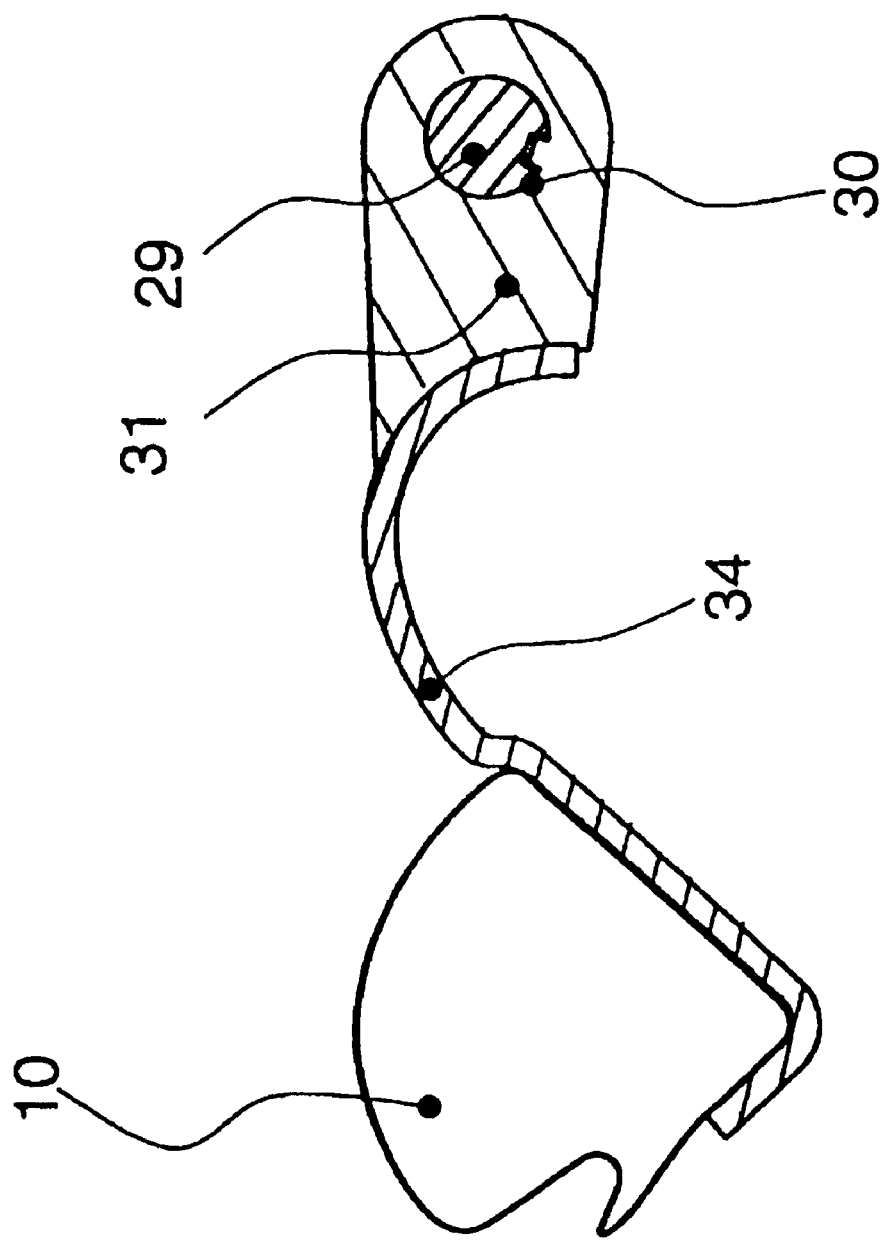
FIG. 12 shows a simplified cross section along line I-I in FIG. 5.
Figure 13:
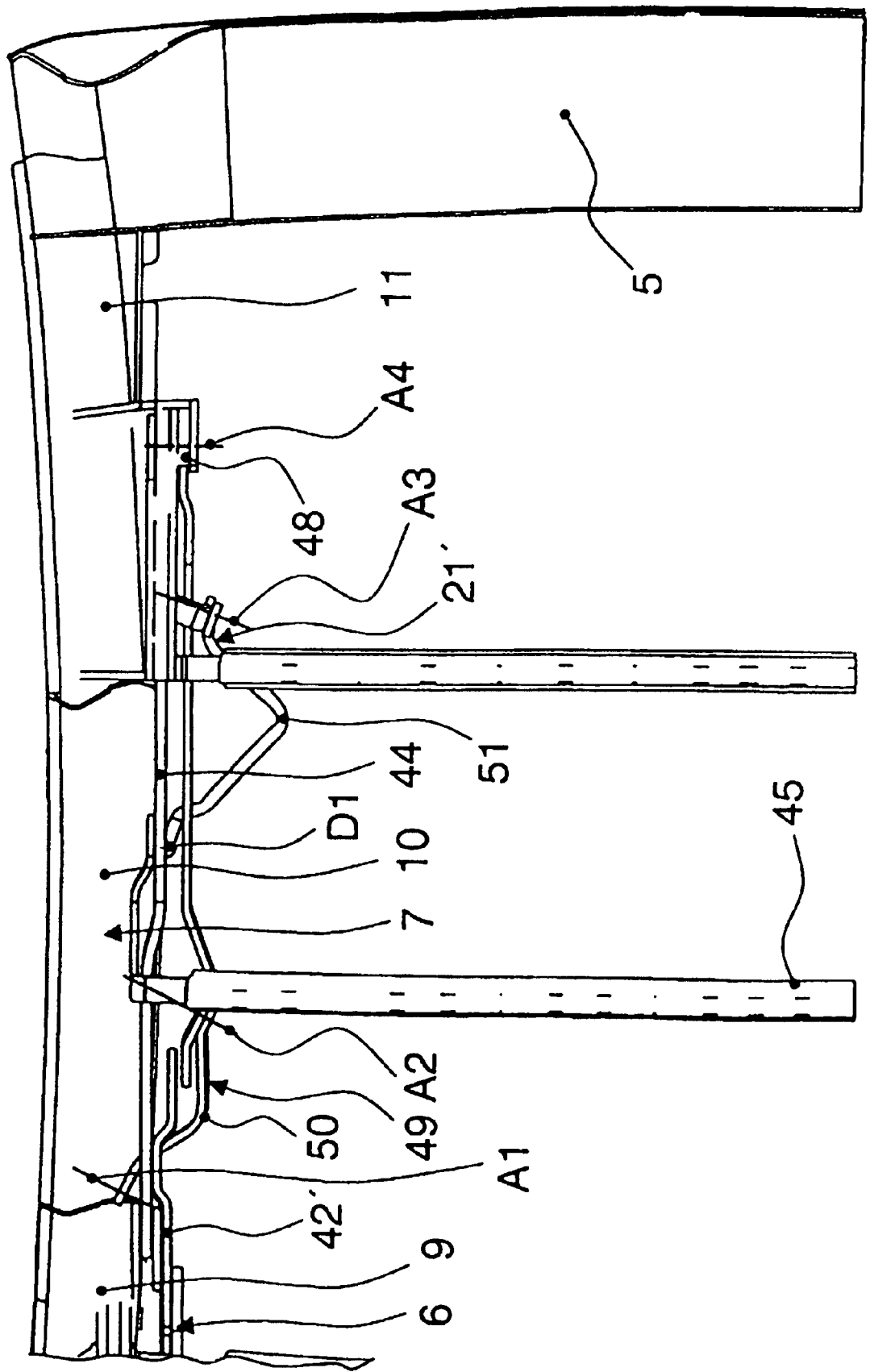
FIG. 13 shows a sectional top view of a second embodiment of the convertible top mechanism with the top in the up [i.e., closed] position.
Figure 14:
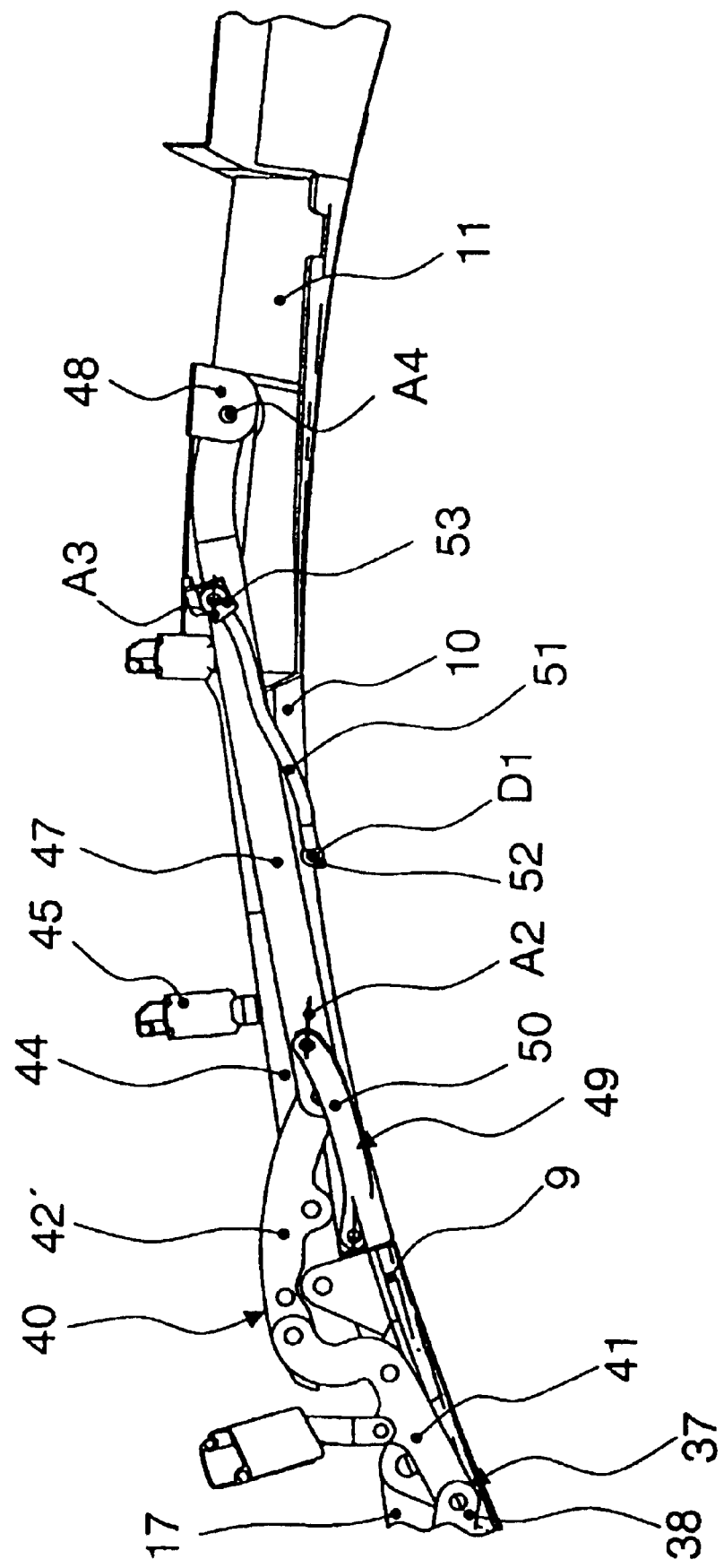
FIG. 14 shows a side view of the convertible top mechanism in accordance with FIG. 15 with the top in up position from a perspective at the center of the vehicle.
Figure 15:
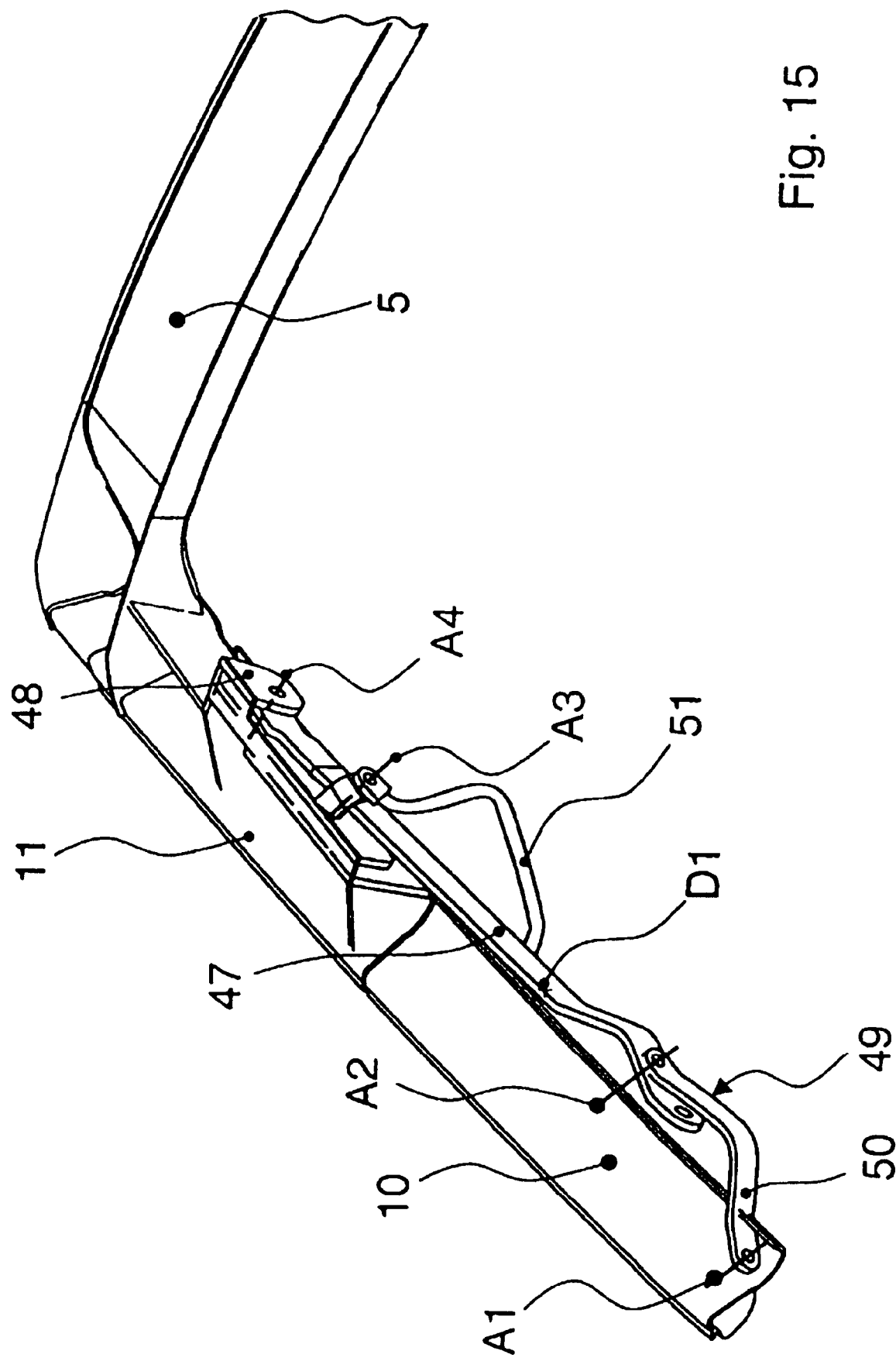
FIG. 15 shows another greatly simplified perspective view of the second embodiment of the convertible top mechanism with the top in the up position.
Figure 16:
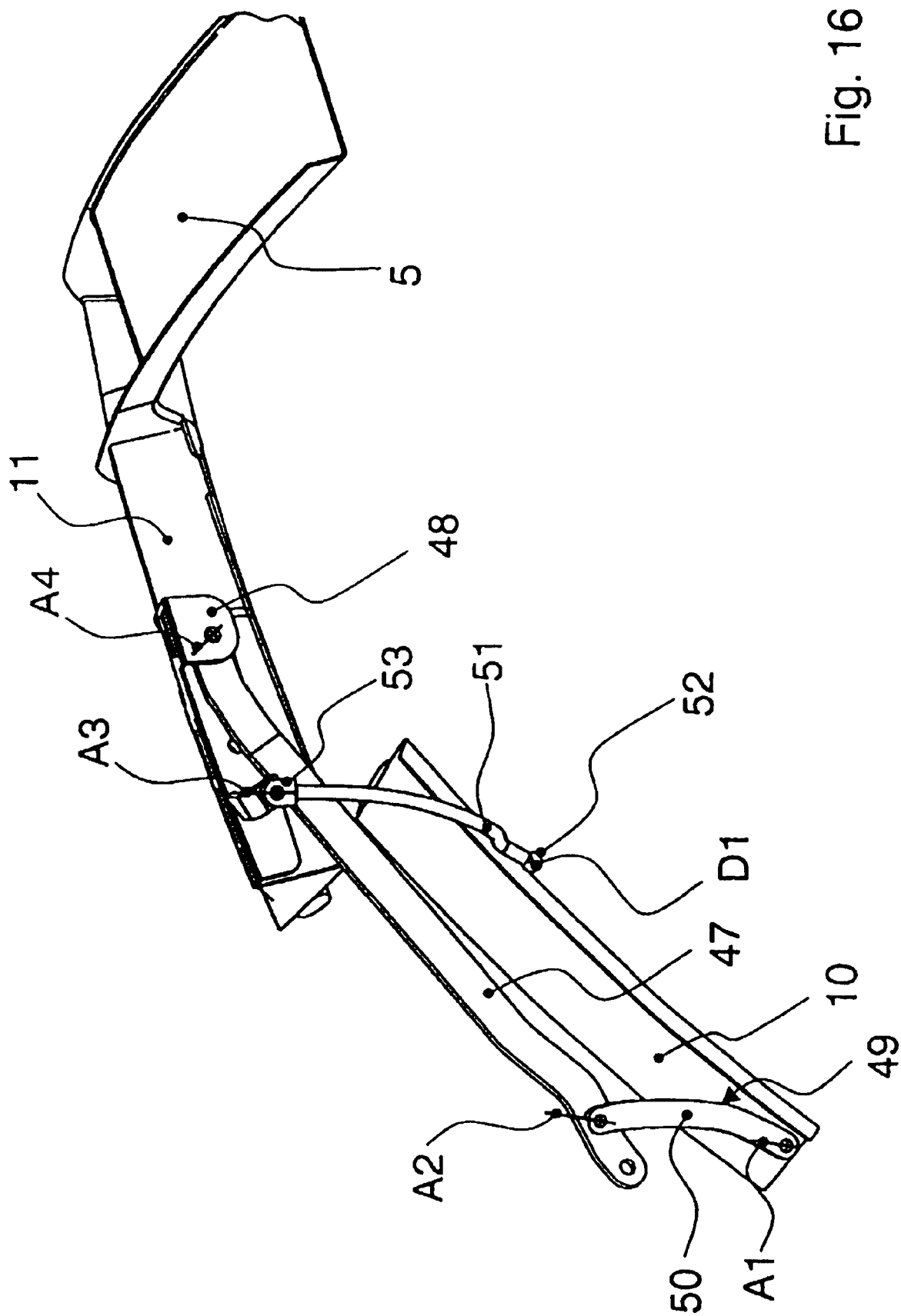
FIG. 16 shows the convertible top mechanism in accordance with FIG. 15 during a first movement phase of the top after initiating a top-down movement.
Figure 17:
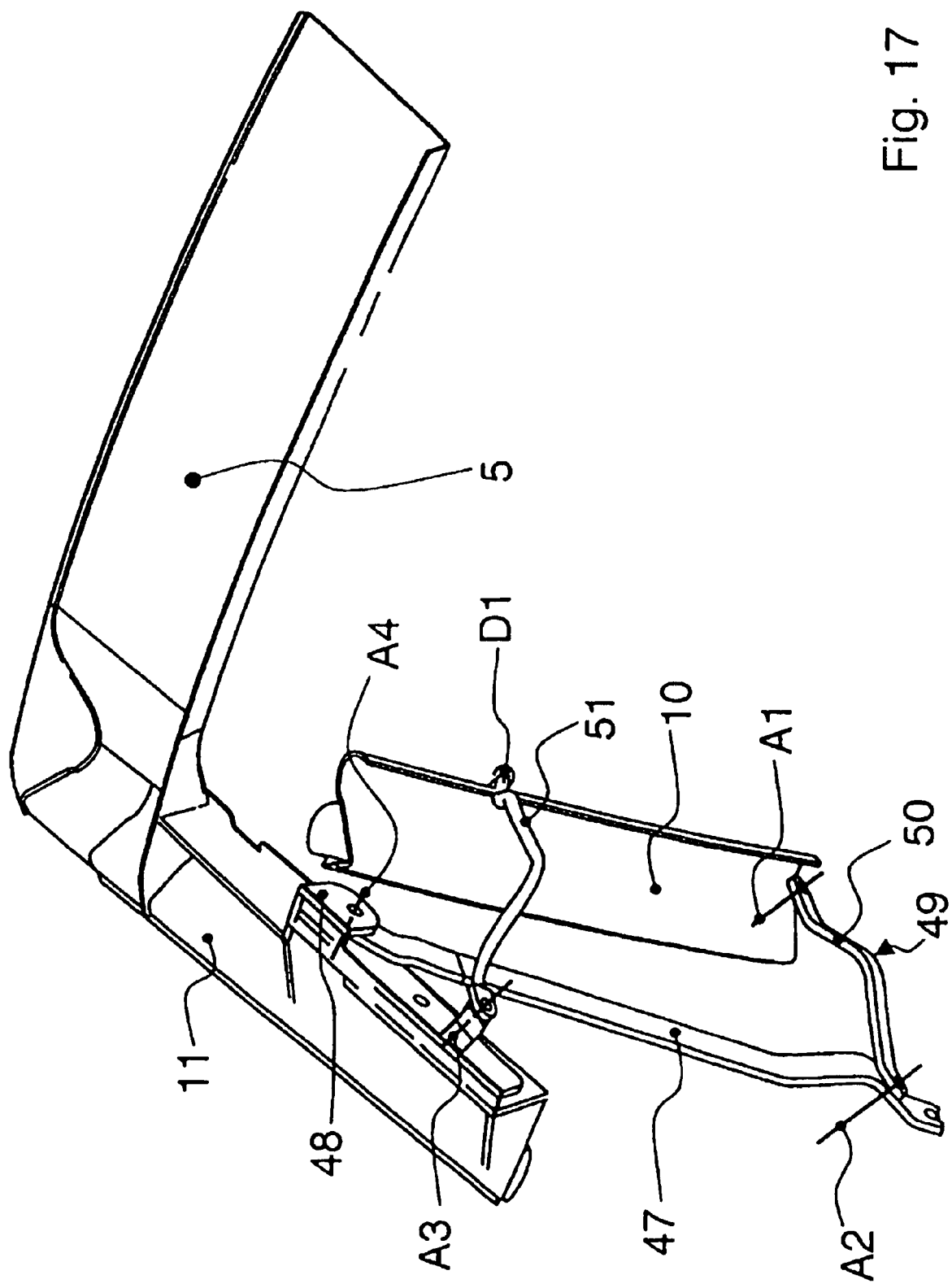
FIG. 17 shows the convertible top mechanism in accordance with FIG. 15 and FIG. 16 during a movement phase of the top in which the top is moved further in the direction of the rear end of the vehicle.
Figure 18:
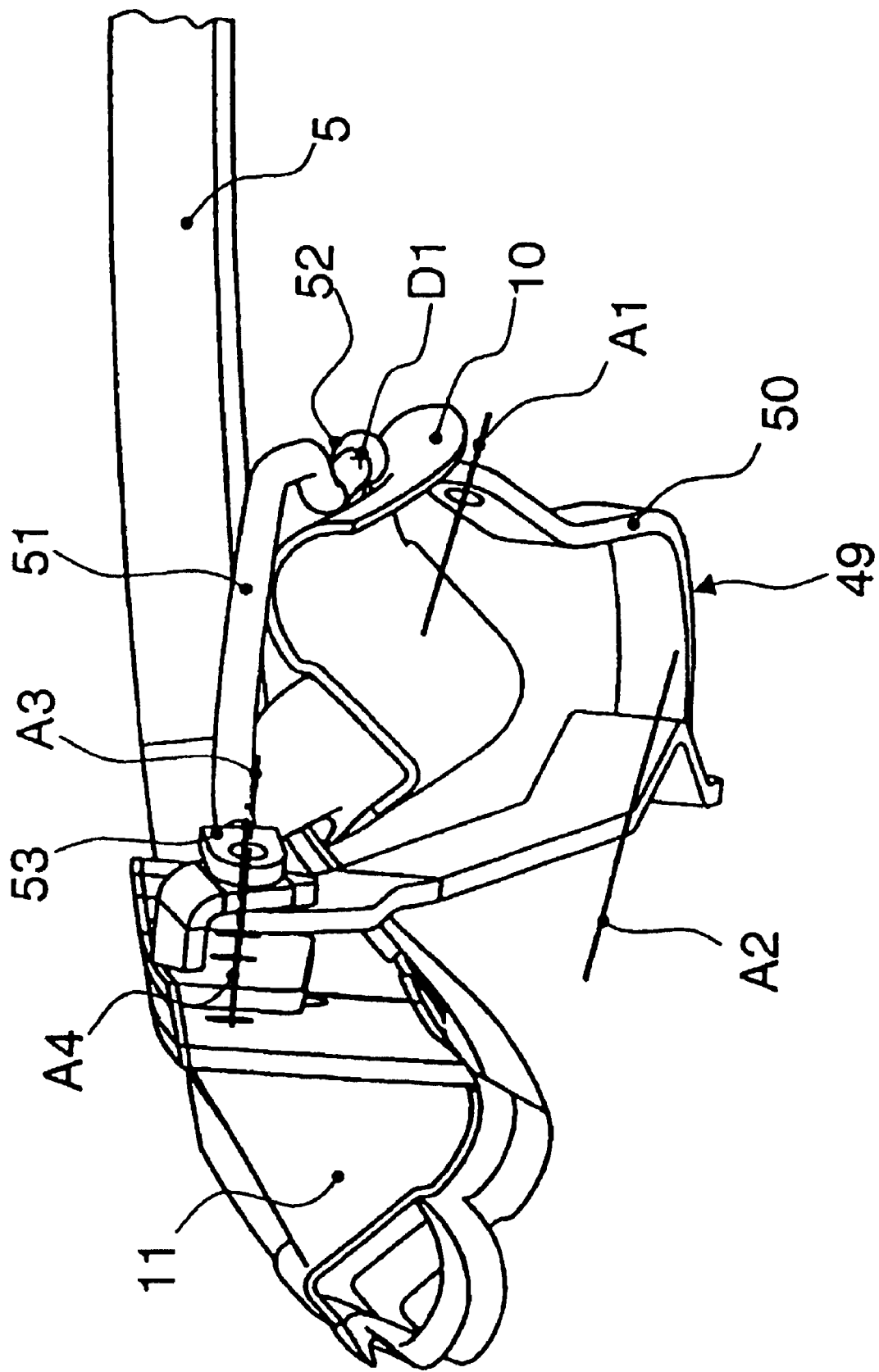
FIG. 18 shows the convertible top mechanism in accordance with FIG. 15 through FIG. 17, with the top being moved further in the direction of the rear end of the vehicle in comparison with the diagram in FIG. 17.
Figure 19:
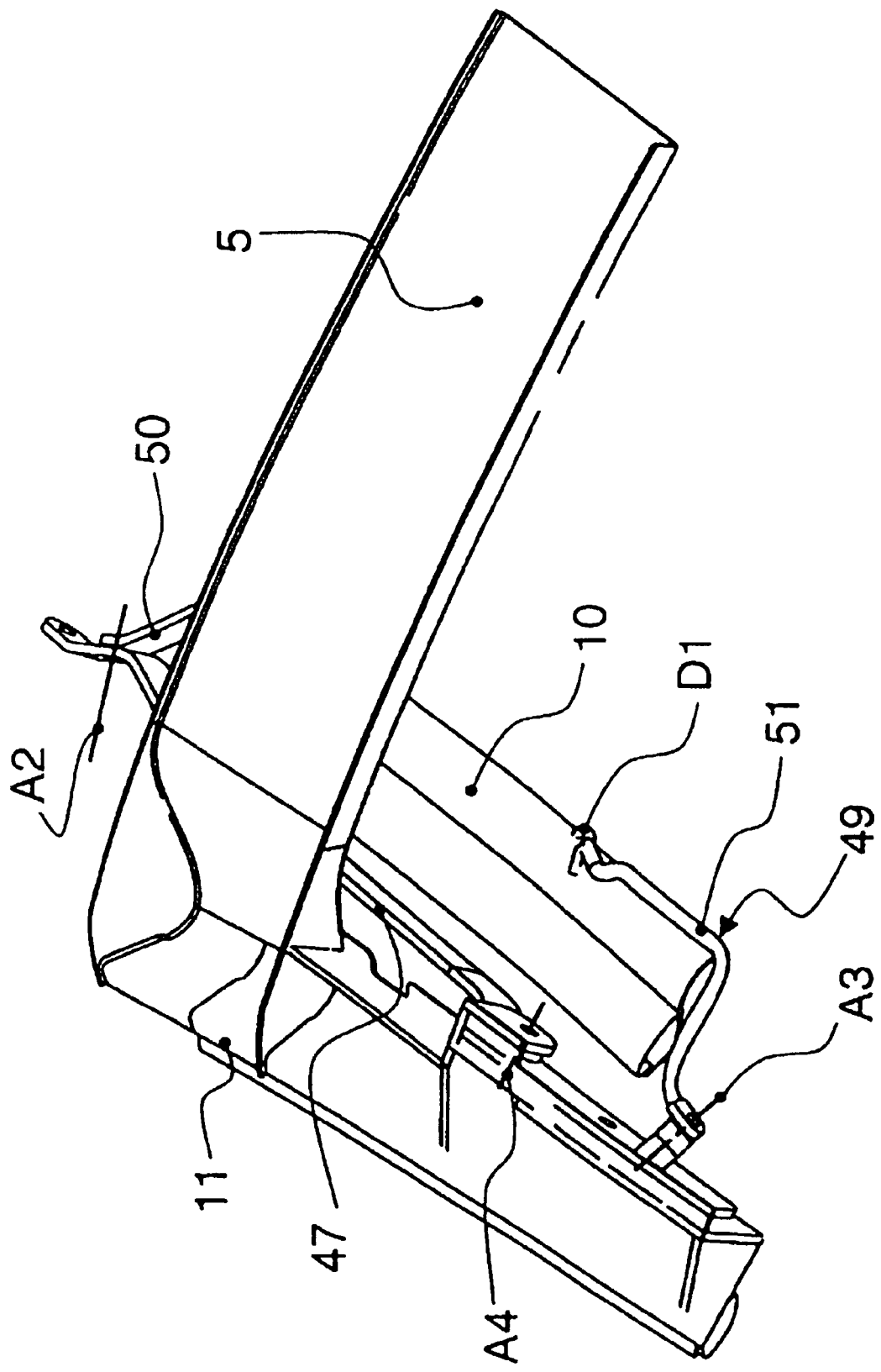
FIG. 19 shows the convertible top mechanism in accordance with FIG. 15 through FIG. 18 in the folded position with the top completely down.
Figure 20:
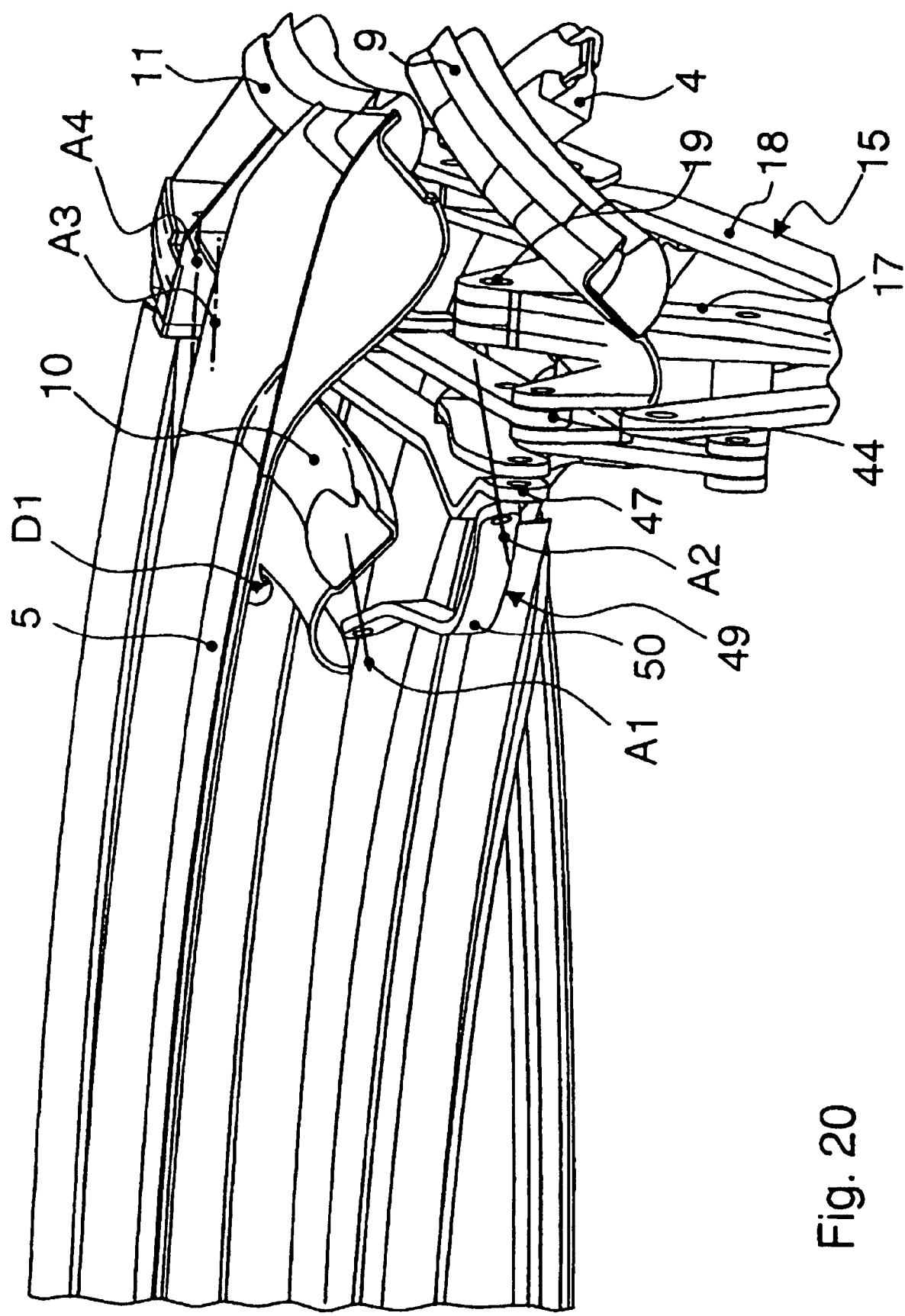
FIG. 20 shows the convertible top in accordance with FIG. 13 through FIG. 19 in the folded position from a perspective at the left of the vehicle toward the rear end.

The connection between the outer roof frame profile 10 and the guide rod 29 may be accomplished, as shown in greater detail in FIG. 12, by means of a connecting strap 34 fixedly attached to the outer roof frame profile 10 and the sliding block 31, but in other embodiments it is of course also possible to select a different comparable guide, and a kinematic reversal may also be provided.

In the preferred embodiment shown here, the guide rod 29 is connected in an articulated joint at one end to the front roof segment 8 and at the other end to the articulated chain 16 of the convertible top mechanism. The coupling element 32 which couples the sliding block to the movement sequence of the convertible top mechanism is designed like a rod and is mounted to pivot about a pivot axis running in the transverse direction of the vehicle; it is axially secured on the sliding block 31 by a ring body 35 which engages in a groove on the sliding block 31, said ring body being pivotably mounted with the rod-like coupling element 32 to pivot about a pivot axis running in the transverse direction of the vehicle and rotationally movably mounted with respect to the sliding block 31 via a rotatability between the ring body 35 and the sliding block. The coupling element 32 is connected via the articulated chain 36 of the convertible top mechanism on its end opposite the sliding block 31.

For accordion folding of the roof segments 6, 7, 8 in the top-down movement of the convertible top 1, the articulated chain 16 of the convertible top mechanism is designed with a first articulated bracket 37 with two legs 38, 39 and a second articulated bracket 40 with the leg 38 and an additional leg 42, with the joint bracket 37, 40 opening and/or closing in opposite directions to one another and being rotationally connected to one another in an articulated joint and being supported on the outer roof frame profile 9 of the rear-end roof segment 6.

The first articulated bracket 37 which is connected in an articulated manner to the leg of the first lever 17 of the 4-bar linkage mechanism 15, said leg facing the main pillar 9, can thus transmit the movement initiated into the main pillar 9 via the second articulated bracket 40 to the guide rod 29 and the coupling element 32 and thus to the outer roof frame profile 10 of the central roof segment 7. The leg 42 facing the guide rod 29 and the coupling element 32 is therefore designed as an articulated block, which is connected by the articulated element 36 to the coupling element 32 which guides the outer roof frame profile 10 of the central roof segment 7 on the guide rod 29 and is connected by another joint 43, which is arranged in an area of the leg, i.e., the joint block 42 at the front in the up position of the convertible top 1, is articulately connected to the guide rod 29.

FIG. 13 through FIG. 20 show another embodiment of the top mechanism with a guide mechanism 21' for the outer roof frame profile 10 of the central roof segment 7, said guide mechanism being modified in comparison with the embodiment in accordance with FIG. 1 through FIG. 12. By means of this guide mechanism, the outer roof frame profile 10 is rotatable in the direction of the center of the vehicle with a top-down movement of the convertible top 1 and/or in the reverse direction with a top-up movement.

The guide mechanism 21' has a control rod 47 which is coupled to the convertible top mechanism and is connected at one end by a joint 48 to the front roof segment 8 and/or with the side of the outer roof frame profile 11 of said front roof segment arranged on the respective side, which faces the center of the vehicle and can be pivoted about a pivot axis A4 parallel to the transverse axis of the vehicle at the joint 48. At its other end, the control rod 47 is connected in an articulated joint to the articulated chain 16 of the convertible top mechanism, with the leg 42 of the second articulated bracket 40 provided for connecting the guide rod 29 in accordance with FIG. 1 through FIG. 12 being replaced here by a leg 42' having one less joint.

The outer roof frame profile 10 of the central roof segment 7 is connected in an articulated joint to the control rod 47 by a lever arrangement 49 which is pivotable about three tilted axes A1, A2, A3, with the tilted axes A1, A2, A3 running at an angle to the pivot axis A4 of the control rod 47 such that the outer roof frame profile 10 is displaced in the direction of the center of the vehicle and rotated with respect to the axis parallel to the longitudinal axis 33 of the vehicle from its position in the up position of the convertible roof 1 with a pivoting of the control rod 47.

The lever arrangement 49 is designed with a first pivot lever 50 which connects the outer roof frame profile 10 to the control rod 47 in an articulated joint, with the first pivot lever 50 being pivotable about a first tilted axis A1 with respect to the outer roof frame profile 10 of the central roof segment 7 and being pivotable about a second tilted axis A2 with respect to the control rod 47. The articulated connection of the first pivot lever 50 on the control rod 47 about the second tilted axis A2 is arranged in an end area of the control rod 47 which faces away from the connection of the control rod 47 to the front roof segment 8. The articulated connection of the first pivot lever 50 on the outer roof frame profile 10 about the first tilted axis A1 is in a rear-end area of the outer roof frame profile 10 when the convertible top 1 is in the top-up position.

In addition, the lever arrangement 49 is designed with a second pivot lever 51 which connects the outer roof frame profile 10 of the central roof segment 7 to the front roof segment 8 and/or in the embodiment shown here, connecting it in an articulated joint to its roof frame profile 11 arranged on the respective side of the vehicle. The second pivot lever 51 here is pivotable about a pivot point D1 with respect to the outer roof frame profile 10 of the central roof segment 7 by means of a ball joint 52, indicated only schematically in FIG. 13 through FIG. 20. With respect to the front roof segment 8, the second pivot lever 51 is pivotable about a third tilted axis A3.

The second pivot lever 51 is connected to the front roof segment 8 by a joint 53 which is arranged on the side of the outer roof frame profile 11 of the front roof segment 8 facing the center of the vehicle in the rear-end area thereof, namely toward the rear end of the joint 48 for connecting the control rod 47. The ball joint 52 for connecting the second pivot lever 51 to the outer roof frame profile 10 of the central roof segment 7 is arranged in an area toward the front of the outer roof frame profile 10 in the down position of the convertible top 1.

The pivot levers 50, 51 of the lever arrangement 49 are each designed with a curvature, with the bends in the respective pivot levers 50, 51 being designed so that they no longer collide with other components, while the outer roof frame profile 10 of the central roof segment 7 describes a curve in a movement of the convertible top 1 between its end positions and is pivoted by 180°.

In the two embodiments of the convertible top mechanism described here, the front roof segment 8 and/or its respective outer roof frame profile 11 is/are tied into the kinematics of the convertible top mechanism in such a way that it is connected in an articulated manner at the rear end of the articulated connection of the guide rod 29 and/or the control rod 47 for the outer roof frame profile 10 of the central roof segment 7, the segment and/or profile being connected to a rod 44 which leads to a front area of the outer roof frame profile 9 of the rear-end roof segment 6 and which also supports one of a plurality of convertible top tension bars 45 that extend under the roof membrane 3.

With the preferred designs of the convertible top mechanism described here, the roof segments 6, 7, 8 can be brought into their folded position in such a way that the rear-end roof segment 6 is deposited first, the central roof segment 7 is deposited above that and the front roof segment 8 is situated at the top, with the roof segment 6, 7, 8 being arranged tightly one above the other and stored with a low packing height, the curvature in the stored position facing away from a bottom of the vehicle whose installed position is labeled as 46 in the figures.

The invention claimed is:

1. Convertible top for a convertible vehicle comprising: a rear-end roof segment, a front-end roof segment and at least one central roof segment, with the roof segments having opposing outer roof frame profiles arranged symmetrically with a vehicle longitudinal axis which can be folded up in accordion fashion via a convertible top mechanism,
wherein the outer roof frame profiles of the at least one central roof segment are shifted in the direction of the center of the vehicle and rotated about an axis at least approximately parallel to the vehicle longitudinal axis in comparison to a position in which the convertible top is put up by means of a guide mechanism and the roof segments are arranged essentially one above the other in a folded position with the convertible top down, with the curvature in the same direction.

2. Convertible top in accordance with claim 1, wherein the roof segments are situated one above the other in the folded position such that their curvature faces away from a vehicle bottom.

3. Convertible top in accordance with claim 1, wherein the roof segments are situated one above the other in the folded position such that their curvature is facing a vehicle bottom.

4. Convertible top in accordance with claim 1, wherein an outer roof frame profile of the at least one central roof segment in the folded position is rotated by at least approximately 180 degree in comparison with its position when the top is up.

5. Convertible top in accordance with claim 1, wherein the guide mechanism of the outer roof frame profile of the at least one central roof segment has a guide rod coupled to the convertible top mechanism, the outer roof frame profile of the at least one central roof segment being guided axially displaceably on the guide rod so that it is rotated about its longitudinal axis in the case of an axial movement with respect to the guide rod.

6. Convertible top in accordance with claim 5, wherein the outer roof frame profile of the at least one central roof segment engages with a sliding block in a spiral groove created in the guide rod, with the sliding block being coupled to the kinematics of the convertible top mechanism via a coupling element.

7. Convertible top in accordance with claim 6, wherein the coupling element is connected first to the sliding block in an axially fixed and rotationally movable manner and second is connected like a hinge to an articulated element of an articulated chain of the convertible top mechanism.

8. Convertible top in accordance with claim 5, wherein the guide rod is connected to the front roof segment of the convertible top mechanism in an articulated joint at one end and to an articulated chain of the convertible top mechanism at the other end.

9. Convertible top in accordance with claim 1, characterized in that the guide mechanism (21') of the outer roof frame profile (10) of the at least one central roof segment (7) has a control rod (47) coupled to the convertible top mechanism and pivotable about a pivot axis (A4) running parallel to the transverse axis of the vehicle and to which the outer roof frame profile (10) is connected in an articulated manner by a lever arrangement (49), with the lever arrangement (49) being pivotable about tilted axes (A1, A2, A3) which run at an angle to the pivot axis (A4) of the control rod (47) such that the outer roof frame profile (10) is shifted in the direction of the center of the vehicle and is rotated with respect to an axis that is parallel to the longitudinal axis (33) of the vehicle when the control rod (47) is pivoted.

10. Convertible top in accordance with claim 9, characterized in that the control rod (47) is connected in an articulated joint to the front roof segment (8), in particular to its outer roof frame profile (11) arranged on the respective side.

11. Convertible top in accordance with claim 9, characterized in that a first pivot lever (50) of the lever arrangement (49) connects the outer roof frame profile (10) of the central roof segment (7) to the control rod (47) in an articulated joint with the first pivot lever (50) being pivotable about a first tilted axis (A1) with respect to the outer roof frame profile (10) of the central roof segment (7) and being pivotable about a second tilted axis (A2) with respect to the control rod (47).

12. Convertible top in accordance with claim 11, characterized in that the articulated connection of the first pivot lever (50) to the control rod (47) is arranged around the second tilted axis (A2) in an end area of the control rod (47) facing away from the connection of the control rod (47) to the front roof segment (6).

13. Convertible top in accordance with claim 11, characterized in that the articulated connection of the first pivot lever (50) to the outer roof frame profile (10) is arranged around the first tilted axis (A1) in a rear-end area of the outer roof frame profile (10) in the up position of the convertible top (1).

14. Convertible top in accordance with claim 9, characterized in that a second pivot lever (51) of the lever arrangement (49) connects in an articulated joint the outer roof frame profile (10) of the central roof segment (7) to the front roof segment (8), in particular to its roof frame profile (11) arranged on the respective vehicle side, with the second pivot lever (51) being pivotable about a pivot point (D1) with respect to the outer roof frame profile (10) of the central roof segment (7) and being pivotable about a third tilted axis (A3) with respect to the front roof segment (8).

15. Convertible top in accordance with claim 14, characterized in that the connection between the second pivot lever (51) and the outer roof frame profile (10) of the central roof segment (7) is designed at the pivot point (D1) by means of a ball joint (52).

16. Convertible top in accordance with claim 14, characterized in that the connection of the second pivot lever (51) on the front roof segment (8) is arranged in a rear-end area of the outer roof frame profile (11) of the front roof segment (8).

17. Convertible top in accordance with claim 14, characterized in that the connection of the second pivot lever (51) to the outer roof frame profile (10) of the central roof segment (7) is arranged in an area of the outer roof frame profile (10) of the central roof segment (7) that is at the front when the convertible top (1) is in the up position.

18. Convertible top in accordance with claim 1, wherein at least the rear-end roof segment is designed with a flexible roof membrane which is accommodated between the outer roof frame profiles facing the rear-end roof segment and a dimensionally stable rear window.

19. Convertible top in accordance with claim 18, wherein the rear window and the outer roof frame profiles of the rear-end roof segment are converted into or out of the folded position in a movement in the same direction.

20. Convertible top in accordance with claim 18, wherein the rear window and the outer roof frame profiles of the rear-end roof segment are arranged essentially parallel to one another during their movement into or out of the folded position.

21. Convertible top in accordance with claim 1, wherein an outer roof frame profile of the rear-end roof segment is connected to a 4-bar linkage mechanism that is in turn connected in an articulated manner to two pivot points fixedly provided on a body of the convertible vehicle and is also connected to an articulated chain which transmits the movement to the other roof segments.

22. Convertible top in accordance with claim 21, wherein the 4-bar linkage mechanism is designed with a first angled lever and a second angled lever, each of which is hinge-connected in an articulated joint to a pivot point fixedly provided on the body of the convertible vehicle and to the outer roof frame profile of the rear-end roof segment.

23. Convertible top in accordance with claim 22, wherein the pivot point of the first lever is fixedly provided on the body of the convertible vehicle and is arranged so the first lever is offset higher and toward the front in comparison with the pivot point of the second lever fixedly provided on the body of the convertible vehicle.

24. Convertible top in accordance with claim 23, wherein a rear window of the convertible vehicle is connected to the 4-bar linkage mechanism by an articulated strap and is connected to the outer roof frame profile of the rear-end roof segment via a flexible roof membrane.

25. Convertible top in accordance with claim 22, wherein a joint is provided between the first lever and the outer roof frame profile of the rear-end roof segment in an area at the front in an up position of the convertible top and a joint is provided between the second lever and the outer roof frame profile of the rear-end roof segment in an area of the outer roof frame profile at the rear in the up position of the top.

26. Convertible top in accordance with claim 22, wherein the first lever is formed at least approximately in a U shape and the second lever is designed at least approximately in an L shape, with the connection to the outer roof frame profile of the rear-end roof segment and to the pivot points fixedly provided on the body of the convertible vehicle being arranged in the area of a leg end of each lever.

27. Convertible top in accordance with claim 22, wherein preferably the first lever is connected to a drive of the convertible top.

28. Convertible top in accordance with claim 22, wherein a main convertible top tension bar is hinge-connected to the second lever.

29. Convertible top in accordance with claim 1, wherein an articulated chain has a first articulated bracket and a second articulated bracket for the transfer of movement, these articulated brackets at least one of opening and closing in opposition to one another and being rotationally connected to one another via a joint arranged on the outer roof frame profile of the rear roof segment, with the first articulated bracket being hinge-connected to a first lever of a 4-bar linkage mechanism and the second articulated bracket being hinge-connected to the guide mechanism of the outer roof frame profile of the central roof segment.

30. Convertible top in accordance with claim 1, wherein the outer roof frame profile of the front roof segment is preferably hinge-connected on the rear end of a connection of the guide mechanism for the outer roof frame profile of the central roof segment with a rod leading to a front area of the outer roof frame profile of the rear-end roof segment.

* * * * *